US012795694B2

(12) United States Patent
Kim

(10) Patent No.: US 12,795,694 B2
(45) Date of Patent: Nov. 10, 2026

(54) METHOD AND APPARATUS FOR MANAGING BEAM IN WIRELESS COMMUNICATION SYSTEM

(71) Applicant: LG ELECTRONICS INC., Seoul (KR)

(72) Inventor: Young Dae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 509 days.

(21) Appl. No.: 18/007,371

(22) PCT Filed: Jul. 29, 2021

(86) PCT No.: PCT/KR2021/009886
§ 371 (c)(1),
(2) Date: Jan. 30, 2023

(87) PCT Pub. No.: WO2022/065665
PCT Pub. Date: Mar. 31, 2022

(65) Prior Publication Data

US 2024/0260054 A1 Aug. 1, 2024

(30) Foreign Application Priority Data

Sep. 23, 2020 (KR) ........................ 10-2020-0123160

(51) Int. Cl.
*H04W 72/25* (2023.01)
*H04W 72/044* (2023.01)
*H04W 88/06* (2009.01)

(52) U.S. Cl.
CPC ......... *H04W 72/25* (2023.01); *H04W 72/044* (2013.01); *H04W 88/06* (2013.01)

(58) Field of Classification Search
CPC ... H04W 72/25; H04W 72/044; H04W 88/06; H04W 76/14; H04W 72/40; H04W 72/23;
(Continued)

(56) References Cited

U.S. PATENT DOCUMENTS

2018/0138962 A1* 5/2018 Islam .................. H04B 7/0695
2019/0380121 A1* 12/2019 Wu ......................... H04W 4/40
(Continued)

FOREIGN PATENT DOCUMENTS

WO 2019-160973 8/2019
WO 2020-033622 2/2020
WO 2020-114651 6/2020

OTHER PUBLICATIONS

PCT International Application No. PCT/KR2021/009886, International Search Report dated Oct. 27, 2021, 4 page.

*Primary Examiner* — Rina C Pancholi
(74) *Attorney, Agent, or Firm* — LEE, HONG, DEGERMAN, KANG & WAIMEY

(57) ABSTRACT

A method of performing device-to-device (D2D) communication by a first terminal in a wireless communication system may comprise the first terminal obtaining beam configuration information, sweeping at least one or more beams based on the beam configuration information and transmitting it to a second terminal, and receiving detected beam information from the second terminal. In this case, beam widths and number of the at least one or more beams configured based on the beam configuration information may be determined based on a target region.

10 Claims, 23 Drawing Sheets

(58) Field of Classification Search
CPC ...... H04W 92/18; H04W 4/40; H04B 7/0617; H04B 7/06954; H04B 7/06952; H04B 7/0408
See application file for complete search history.

(56) References Cited

U.S. PATENT DOCUMENTS

| | | | | |
|---|---|---|---|---|
| 2020/0045664 | A1* | 2/2020 | Choi | H04W 4/40 |
| 2020/0235997 | A1* | 7/2020 | Shimizu | H04W 4/029 |
| 2021/0160851 | A1* | 5/2021 | Akkarakaran | H04B 7/06954 |
| 2022/0166571 | A1* | 5/2022 | Jiang | H04W 4/40 |

* cited by examiner

FIG. 15

| LANE WIDTH | 3.5 m | | Beam width | | | | | |
|---|---|---|---|---|---|---|---|---|
| Target lane number (N) | 3 | | 6° | | | 12° | 24° | 48° |
| STRAIGHT-LINE DISTANCE BETWEEN VEHICLE (m) A | DISTANCE FROM DIAGONAL VEHICLE B | ANGLE WITH DIAGONAL VEHICLE C | Beam coverage (LENGTH OF ARC m) | Beam coverage (+: NUMBER OF LANES PER BEAM, -: NUMBER OF BEAMS PER LANE) | # of necessary beams for N lanes | # of necessary beams for N lanes | # of necessary beams for N lanes | # of necessary beams for N lanes |
| 1 | 3.64 | 74.1 | 0.10 | -33.4 | 101 | 51 | 26 | 13 |
| 3 | 4.61 | 49.4 | 0.31 | -11.1 | 34 | 17 | 9 | 5 |
| 3.1 | 4.68 | 48.5 | 0.32 | -10.6 | 33 | 17 | 9 | 5 |
| 3.2 | 4.74 | 47.6 | 0.34 | -10.4 | 32 | 16 | 8 | 4 |
| 3.5 | 4.95 | 45.0 | 0.37 | -9.5 | 29 | 15 | 8 | 4 |
| 5 | 6.10 | 35.0 | 0.52 | -6.7 | 31 | 11 | 6 | 3 |
| 10 | 10.59 | 19.3 | 1.05 | -3.3 | 11 | 6 | 3 | 2 |
| 12.6 | 13.08 | 15.5 | 1.32 | -2.7 | 8 | 4 | 2 | 1 |
| 20 | 20.30 | 9.9 | 2.09 | -1.7 | 6 | 3 | 2 | 1 |
| 25 | 25.23 | 7.7 | 2.72 | -1.3 | 4 | 2 | 1 | 1 |
| 30 | 30.20 | 6.7 | 3.14 | -1.1 | 4 | 2 | 1 | 1 |
| 40 | 40.15 | 5.0 | 4.19 | 1.2 | 3 | 2 | 1 | 1 |
| 50 | 50.12 | 4.0 | 5.24 | 1.5 | 3 | 2 | 1 | 1 |
| 51 | 51.12 | 3.9 | 5.34 | 1.5 | 2 | 1 | 1 | 1 |
| 60 | 60.10 | 3.3 | 6.28 | 1.8 | 2 | 1 | 1 | 1 |
| 70 | 70.09 | 2.9 | 7.33 | 2.1 | 2 | 1 | 1 | 1 |
| 80 | 80.08 | 2.5 | 8.38 | 2.4 | 2 | 1 | 1 | 1 |
| 90 | 90.07 | 2.2 | 9.42 | 2.7 | 2 | 1 | 1 | 1 |
| 100 | 100.06 | 2.0 | 10.47 | 3.0 | 2 | 1 | 1 | 1 |

METHOD AND APPARATUS FOR MANAGING BEAM IN WIRELESS COMMUNICATION SYSTEM

CROSS-REFERENCE TO RELATED APPLICATION(S)

This application is the National Stage filing under 35 U.S.C. 371 of International Application No. PCT/KR2021/009886, filed on Jul. 29, 2021, which claims the benefit of earlier filing date and right of priority to Korean Application No. 10-2020-0123160, filed on Sep. 23, 2020, the contents of which are all hereby incorporated by reference herein in their entireties.

BACKGROUND

Field

The following description relates to a wireless communication system, and relates to a method and apparatus for managing a beam in a wireless communication system.

In particular, it relates to a method and apparatus for efficiently managing a beam used to transmit and receive signals between terminals in sidelink (SL) communication.

Description of the Related Art

A wireless communication system is a multiple access system that supports communication of multiple users by sharing available system resources (e.g., a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (mMTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

The present disclosure relates to a beam management method and apparatus in a wireless communication system.

The present disclosure relates to a method of managing a beam used to exchange signals between terminals in sidelink communication of a wireless communication system.

The present disclosure relates to a method of setting various beam widths in consideration of a case where device-to-device (D2D) communication is performed through beamforming based on mmWave in sidelink communication of a wireless communication system.

The present disclosure relates to a method of differently setting beam widths in consideration of a distance between terminals and a location of a counterpart terminal in sidelink communication of a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method of performing device-to-device (D2D) communication by a first terminal in a wireless communication system, the method comprising: the first terminal obtaining beam configuration information; sweeping at least one or more beams based on the beam configuration information and transmitting it to a second terminal; and receiving detected beam information from the second terminal, wherein beam widths and number of the at least one or more beams configured based on the beam configuration information are determined based on a target region.

As an example of the present disclosure, a method of performing device-to-device (D2D) communication by a first terminal in a wireless communication system, the method comprising: the first terminal obtaining beam configuration information; receiving at least one or more beams swept based on the beam configuration information from a second terminal; and detecting the at least one or more beams and transmitting detected beam information to the second terminal, wherein beam widths and number of the at least one or more beams configured based on the beam configuration information are determined based on a target region.

As an example of the present disclosure, a terminal for performing device-to-device (D2D) communication in a wireless communication system, the terminal comprising: a transceiver, and a processor connected to the transceiver, wherein the processor is configured to: obtain beam configuration information, sweep at least one or more beams based on the beam configuration information and transmit it to a second terminal, and receive detected beam information from the another terminal through the transceiver, wherein beam widths and number of the at least one or more beams configured based on the beam configuration information are determined based on a target region.

As an example of the present disclosure, a terminal for performing device-to-device (D2D) communication in a wireless communication system, the terminal comprising: a transceiver; and a processor connected to the transceiver, wherein the processor is configured to: obtain beam configuration information, receive at least one or more beams swept based on the beam configuration information from another terminal through the transceiver, and detect the at least one or more beams and transmit detected beam information to the another terminal through the transceiver, wherein beam widths and number of the at least one or more beams configured based on the beam configuration information are determined based on a target region.

As an example of the present disclosure, an apparatus comprising at least one memory and at least one processor functionally connected to the at least one memory, wherein the at least one processor enables the apparatus to: obtain beam configuration information, sweep at least one or more beams based on the beam configuration information and transmit it to another apparatus, and receive detected beam information from the another apparatus through a transceiver, wherein beam widths and number of the at least one or more beams configured based on the beam configuration information are determined based on a target region.

As an example of the present disclosure, a non-transitory computer-readable medium storing at least one instruction, the non-transitory computer-readable medium comprising the at least one instruction executable by a processor, wherein the at least one instruction enables an apparatus to: obtain beam configuration information, sweep at least one or more beams based on the beam configuration information and transmit it to another apparatus, and receive detected beam information from the another apparatus through a transceiver, wherein beam widths and number of the at least one or more beams configured based on the beam configuration information are determined based on a target region.

In addition, the followings are applied in common.

As an example of the present disclosure, the target region is divided into a plurality of regions based on a distance from the first terminal, and the beam widths and number of beams are determined according to the plurality of regions.

As an example of the present disclosure, a beam width of a first region among the plurality of regions is determined to be a first value and a beam width of a second region is determined to be a second value, and wherein, when the first region is closer to the first terminal than the second region, the first value is set to a value greater than the second value.

As an example of the present disclosure, a discovery beam set used by the first terminal and the second terminal for initial beam configuration and a tracking beam set used for beam refinement and beam tracking after the first terminal and the second terminal are connected are configured differently.

As an example of the present disclosure, beam widths and number of beams of each of the discovery beam set and the tracking beam set are determined differently according to the plurality of regions in the target region.

As an example of the present disclosure, when the beam width of the discovery beam set for the first region among the plurality of regions is determined to be a first value and the beam width of the discovery beam set for the second region which is a next region of the first region is determined to be a second value based on a distance from the first terminal, the beam width of the tracking beam set for the first region is determined to be a second value.

As an example of the present disclosure, the number of beams of the tracking beam set for the first region is set greater than the number of beams of the discovery beam set for the second region.

As an example of the present disclosure, when the second terminal detects the at least one or more beams transmitted by the first terminal based on initial beam configuration or beam failure recovery, the second terminal performs measurement on each of the at least one or more beams transmitted by the first terminal through sweeping to obtain measurement value information and transmits measurement value information of each of the at least one or more beams to the first terminal as the detected beam information.

As an example of the present disclosure, the second terminal obtains measurement value information of each of the at least one or more beams based on a beam sweeping period and transmits all the measurement value information to the first terminal as the detected beam information.

As an example of the present disclosure, the first terminal determines a distance and location of the second terminal based on the received measurement value information of each of the at least one or more beams.

The following effects may be obtained by embodiments based on the present disclosure.

According to the present disclosure, it is possible to provide a beam management method and apparatus in a wireless communication system.

According to the present disclosure, it is possible to manage a beam used to exchange signals between terminals in sidelink communication of a wireless communication system.

According to the present disclosure, it is possible to provide a method of setting various beam widths in consideration of a case where device-to-device (D2D) communication is performed through beamforming based on mmWave in sidelink communication of a wireless communication system.

According to the present disclosure, it is possible to differently set beam widths in consideration of a distance between terminals and a location of a counterpart terminal in sidelink communication of a wireless communication system.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure.

That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 15 is a diagram illustrating a method of configuring beams having different beam widths based on a distance according to an embodiment of the present disclosure.

DETAILED DESCRIPTION

Figure 1:
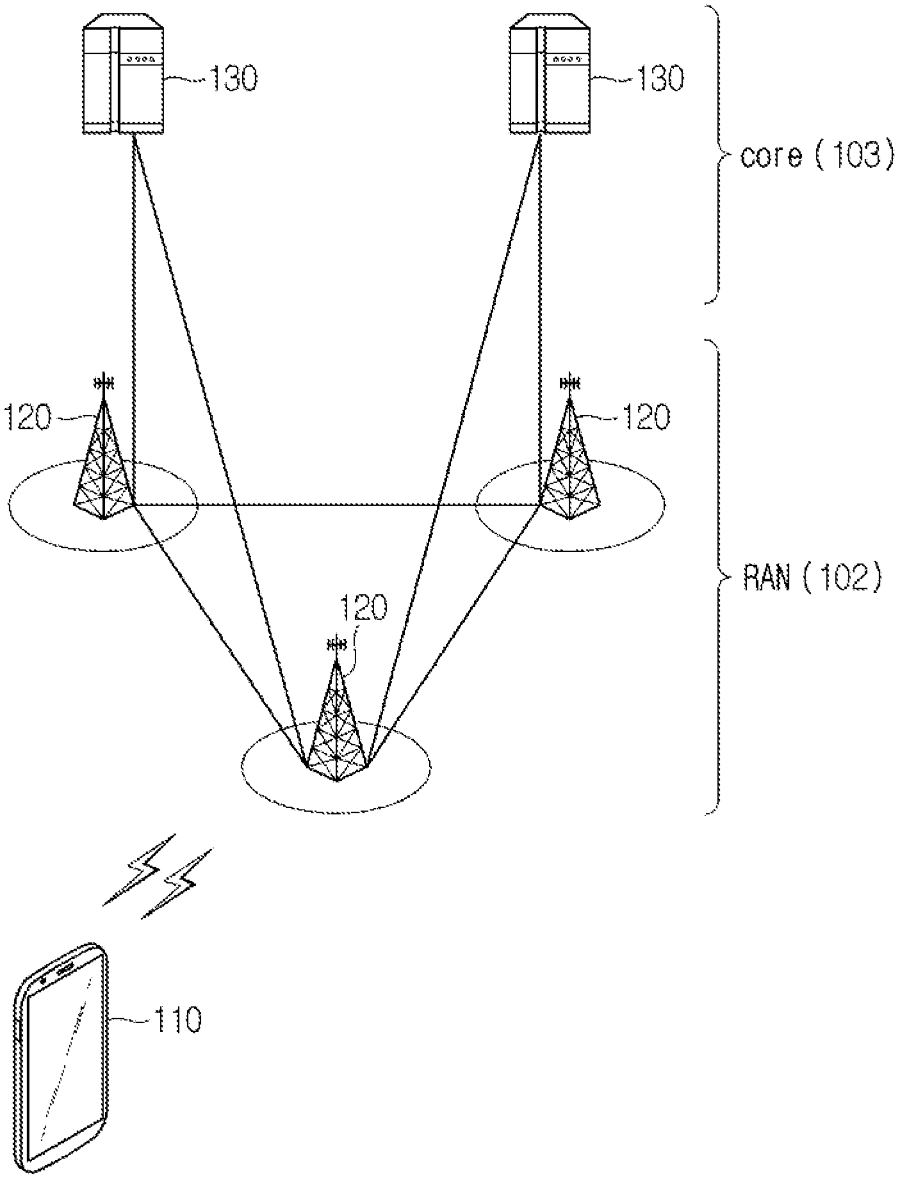
FIG. 1 illustrates a structure of a wireless communication system according to an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information"

In the following description, 'when, if, in case of' may be replaced with 'on the basis of/based on'.

A technical feature described individually in one figure in the present specification may be individually implemented, or may be simultaneously implemented.

In this specification, a higher layer parameter may be set for a terminal, set in advance, or predefined. For example, a base station or a network may transmit a higher layer parameter to a terminal. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, reference may be made to a wireless communication standard documents (3GPP TS36.XXX, 3GPP TS37.XXX and 3GPP TS38.XXX) published before this specification is filed. For example, the following document may be referred to.

Communication System to which the Present Disclosure is Applicable

FIG. 1 illustrates a structure of a wireless communication system according to an embodiment of the present disclosure. The embodiment of FIG. 1 may be combined with various embodiments of the present disclosure.

Referring to FIG. 1, the wireless communication system includes a radio access network (RAN) 102 and a core network 103. The radio access network 102 includes a base station 120 that provides a control plane and a user plane to a terminal 110. The terminal 110 may be fixed or mobile, and may be called a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called a fixed station, a Node B, an eNB (eNode B), a gNB (gNode B), an ng-eNB, an advanced base station (ABS) or an access point, a base transceiver system (BTS), or an access point (AP). The core network 103 includes a core network entity 130. The core network entity 130 may be defined in various ways according to functions, and may be called other terms such as a core network node, a network node, and a network equipment.

Components of a system may be referred to differently according to an applied system standard. In the case of LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of a terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of 5G NR standard, the radio access network 102 may be referred to as NG-RAN, and the core network 103 may be referred to as 5GC (5G core). In this case, the core network 103 includes an access and mobility management function (AMF), a user plane function (UPF), and a session management function (SMF). The AMF provides a function for access and mobility management in units of terminals, the UPF performs a function of mutually transferring data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

Figure 2:
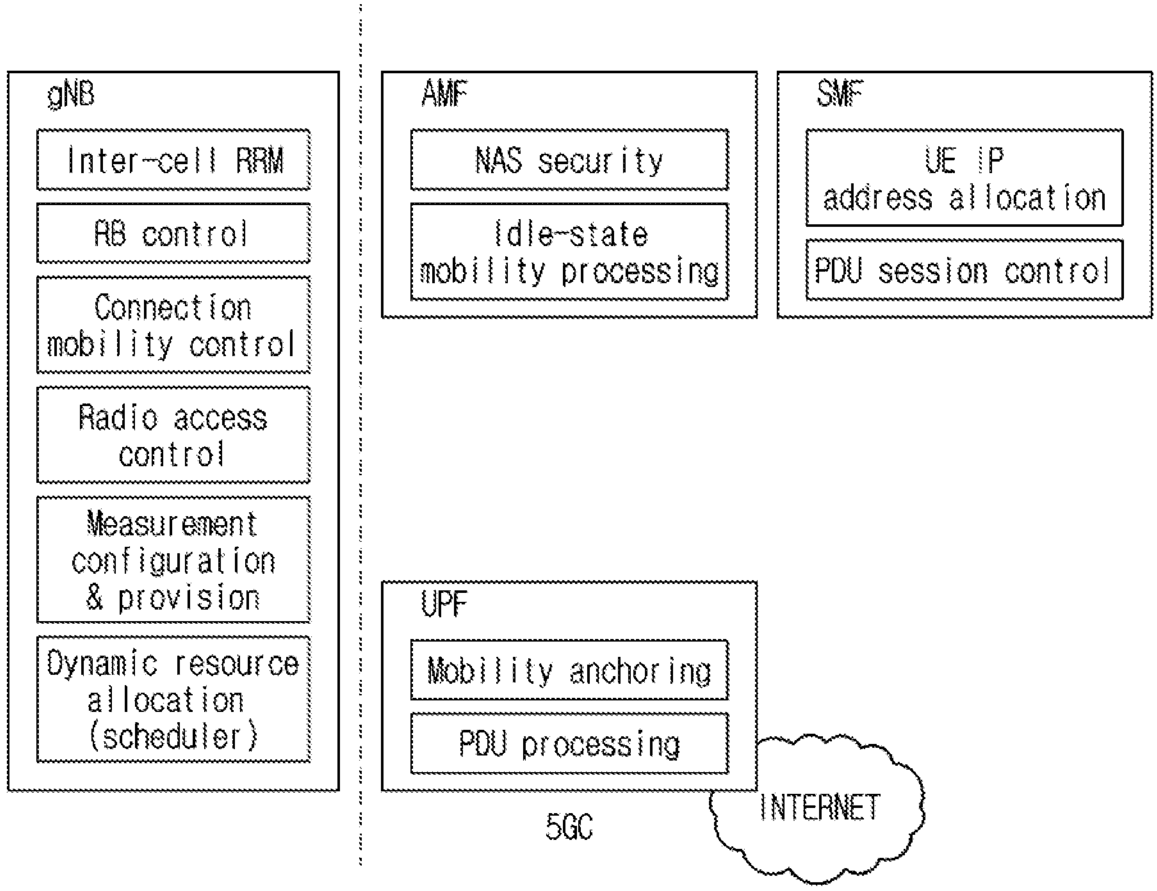
FIG. 2 illustrates a functional division between an NG-RAN and a 5GC applicable to the present disclosure.

FIG. 2 illustrates a functional division between an NG-RAN and a 5GC applicable to the present disclosure. The embodiment of FIG. 2 may be combined with various embodiments of the present disclosure.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. AUPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer enable to exchange an RRC message between the UE and the BS.

V2X or Sidelink Communication

Figure 3A:
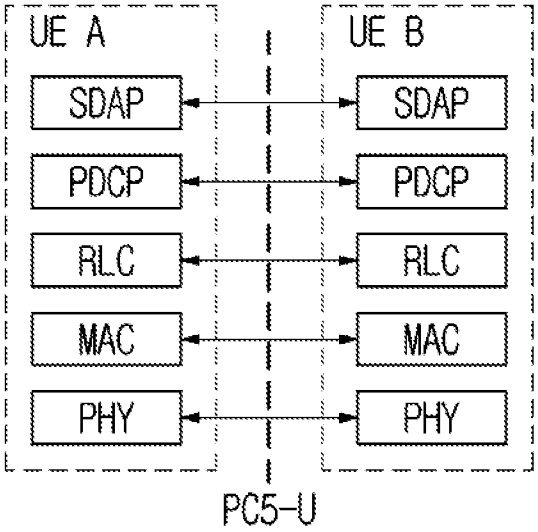
FIGS. 3A and 3B illustrate a radio protocol architecture applicable to the present disclosure.
Figure 3B:
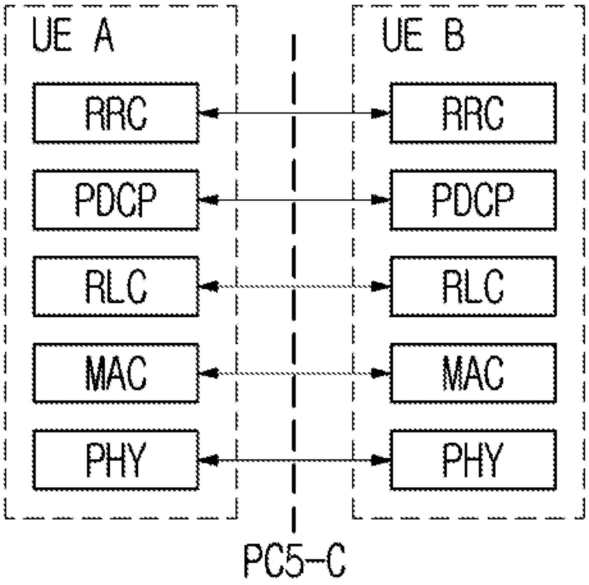

FIGS. 3A and 3B illustrate a radio protocol architecture applicable to the present disclosure. The embodiment of FIG. 3 may be combined with various embodiments of the present disclosure. Specifically, FIG. 3A exemplifies a radio protocol architecture for a user plane, and FIG. 3B exemplifies a radio protocol architecture for a control plane. The user plane corresponds to a protocol stack for user data transmission, and the control plane corresponds to a protocol stack for control signal transmission.

The SLSS may include a primary sidelink synchronization signal (PSSS) and a secondary sidelink synchronization signal (SSSS), as an SL-specific sequence.

The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, S-SSS, and PSBCH may be included in a block format supporting periodic transmission (e.g., SL SS (Synchronization Signal)/PSBCH block, hereinafter, S-SSB (Sidelink-Synchronization Signal Block). The S-SSB may have the same numerology (i.e., SCS and CP length) as PSCCH (Physical Sidelink Control Channel)/PSSCH (Physical Sidelink Shared Channel) in the carrier, and the transmission bandwidth is (pre) set SL BWP (Sidelink BWP) For example, the bandwidth of the S-SSB may be 11 Resource Blocks (RBs). For example, the PSBCH may span 11 RBs. And, the frequency location of the S-SSB (in advance) can be configured Therefore, the UE does not need to perform hysteresis detection in frequency to discover the S-SSB in the carrier.

Synchronization Acquisition of SL Terminal

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 4:
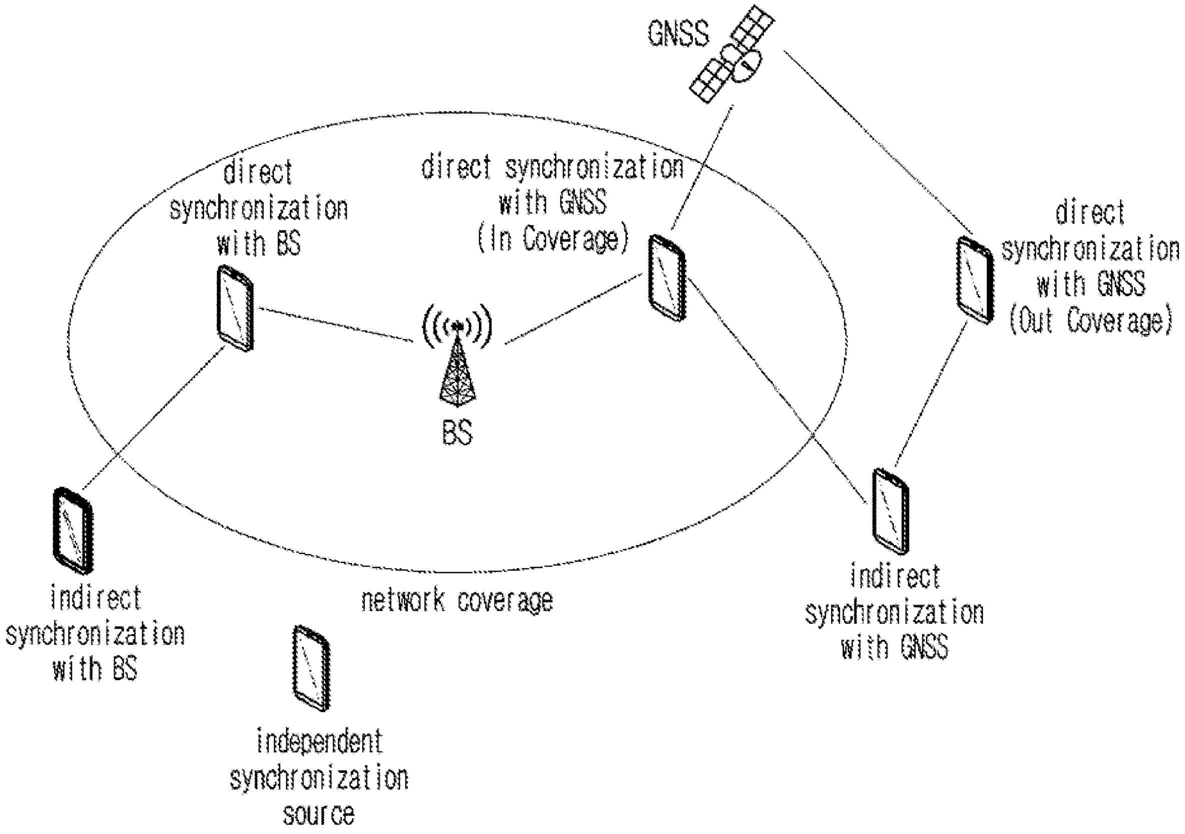
FIG. 4 illustrates a synchronization source or synchronization reference of V2X applicable to the present disclosure.

FIG. 4 illustrates a synchronization source or synchronization reference of V2X applicable to the present disclosure. The embodiment of FIG. 4 may be combined with various embodiments of the present disclosure.

Referring to FIG. 4, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 1] or [Table 2]. [Table 1] or [Table 2] is merely an example, and the relationship between synchronization sources and synchronization priorities may be defined in various manners.

TABLE 1

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 2

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 1] or [Table 2], P0 may represent a highest priority, and P6 may represent a lowest priority. In [Table 1] or [Table 32], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

For example, the terminal may (re)select a synchronization reference, and the terminal may obtain synchronization from the synchronization reference. In addition, the terminal may perform SL communication (e.g., PSCCH/PSSCH transmission/reception, Physical Sidelink Feedback Channel (PSFCH) transmission/reception, S-SSB transmission/reception, reference signal transmission/reception, etc.) based on the obtained synchronization.

Figure 5A:
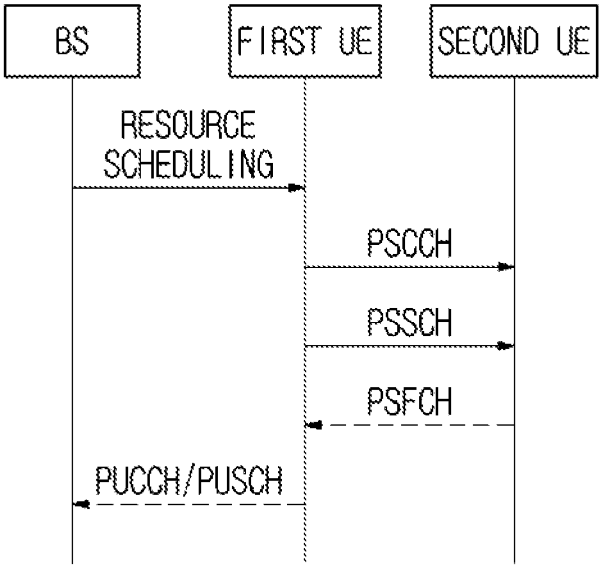
FIGS. 5A and 5B illustrate a procedure of performing V2X or SL communication by a terminal based on a transmission mode applicable to the present disclosure.
Figure 5B:
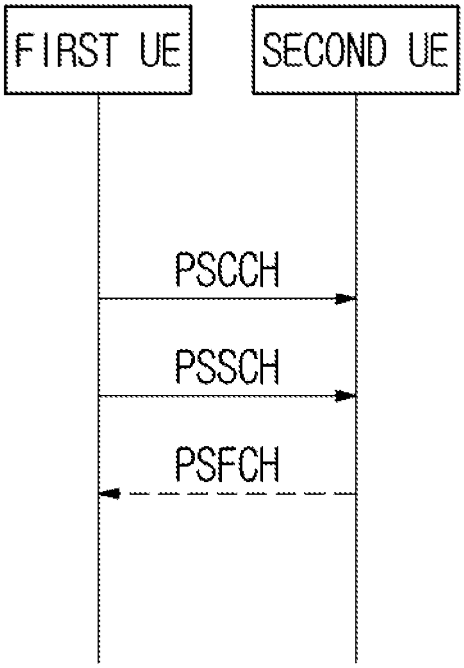

FIGS. 5A and 5B illustrate a procedure of performing V2X or SL communication by a terminal based on a transmission mode applicable to the present disclosure. The embodiment of FIGS. 9A and 9B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 5A exemplifies a UE operation related to an LTE transmission mode 1 or an LTE transmission mode 3. Alternatively, for example, FIG. 9B exemplifies a UE operation related to an NR resource allocation mode 1. For example, the LTE transmission mode 1 may be applied to general SL communication, and the LTE transmission mode 3 may be applied to V2X communication.

For example, FIG. 9B exemplifies a UE operation related to an LTE transmission mode 2 or an LTE transmission mode 4. Alternatively, for example, FIG. 9A exemplifies a UE operation related to an NR resource allocation mode 2.

Referring to FIG. 5A, in the LTE transmission mode 1, the LTE transmission mode 3, or the NR resource allocation mode 1, a BS may schedule an SL resource to be used by the UE for SL transmission. For example, the base station may transmit information related to SL resources and/or information related to UL resources to the first terminal. For example, the UL resources may include a PUCCH resource and/or a PUSCH resource. For example, the UL resources may be resources for reporting SL HARQ feedback to the base station.

For example, the first terminal may receive information related to a dynamic grant (DG) resource and/or information related to a configured grant (CG) resource from the base station. For example, the CG resource may include a CG type 1 resource or a CG type 2 resource. In this specification, the DG resource may be a resource configured/allocated by the base station to the first terminal through downlink control information (DCI). In this specification, the CG resource may be a (periodic) resource configured/allocated by the base station to the first terminal through DCI and/or RRC messages. For example, in the case of a CG type 1 resource, the base station may transmit an RRC message including information related to the CG resource to the first terminal. For example, in the case of a CG type 2 resource, the base station may transmit an RRC message including information related to the CG resource to the first terminal, and the base station may transmit DCI related to activation or release of the CG resource to the first terminal.

Subsequently, the first terminal may transmit a PSCCH (e.g., SCI (Sidelink Control Information) or 1st-stage SCI) to a second terminal based on the resource scheduling. Thereafter, the first terminal may transmit a PSSCH (e.g., 2nd-stage SCI, MAC PDU, data, etc.) related to the PSCCH to the second terminal. Thereafter, the first terminal may receive a PSFCH related to the PSCCH/PSSCH from the second terminal. For example, HARQ feedback information (e.g., NACK information or ACK information) may be received from the second terminal through the PSFCH. Thereafter, the first terminal may transmit/report HARQ feedback information to the base station through a PUCCH or PUSCH. For example, the HARQ feedback information reported to the base station may be information generated by the first terminal based on HARQ feedback information received from the second terminal. For example, the HARQ feedback information reported to the base station may be information generated by the first terminal based on a preset rule. For example, the DCI may be DCI for SL scheduling. For example, the format of the DCI may be DCI format 3_0 or DCI format 3_1. Referring to FIG. 9B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. For example, the first terminal that has selected a resource within the resource pool by itself may transmit a PSCCH (e.g., sidelink control information (SCI) or 1st-stage SCI) to the second terminal using the resource. Subsequently, the first terminal may transmit a PSSCH (e.g., 2nd-stage SCI, MAC PDU, data, etc.) related to the PSCCH to the second terminal. Thereafter, the first terminal may receive a PSFCH related to the PSCCH/PSSCH from the second terminal.

Referring to FIG. 5A or 5B, for example, the first terminal may transmit the SCI to the second terminal on the PSCCH. Alternatively, for example, the first terminal may transmit two consecutive SCIs (e.g., 2-stage SCI) to the second terminal on the PSCCH and/or the PSSCH. In this case, the second terminal may decode two consecutive SCIs (e.g., 2-stage SCI) to receive the PSSCH from the first terminal. In this specification, the SCI transmitted on the PSCCH may be referred to as 1st SCI, first SCI or 1st-stage SCI or 1st-stage SCI format, and SCI transmitted on the PSSCH is 2nd SCI, second SCI, 2nd-stage SCI or 2nd-stage SCI format. For example, the 1st-stage SCI format may include SCI format 1-A, and the 2nd-stage SCI format may include SCI format 2-A and/or SCI format 2-B. Referring to FIG. 9A or 9B, the first terminal may receive a PSFCH. For example, the first terminal and the second terminal may determine a PSFCH resource and the second terminal may transmit HARQ feedback to the first terminal using the PSFCH resource. In addition, referring to FIG. 9A, the first terminal may transmit SL HARQ feedback to the base station through a PUCCH and/or a PUSCH.

Figure 6A:
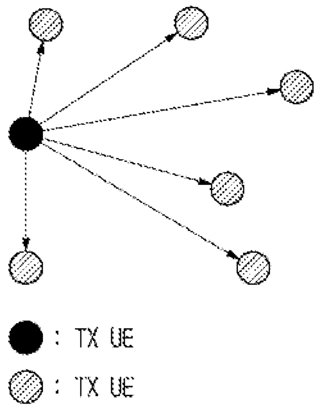
FIGS. 6A to 6C illustrate three cast types applicable to the present disclosure.
Figure 6B:
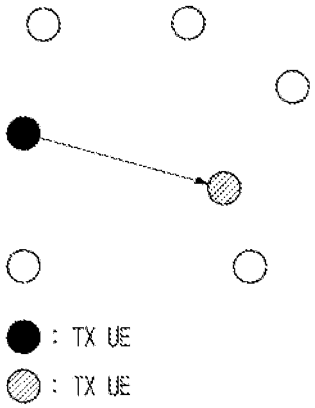
Figure 6C:
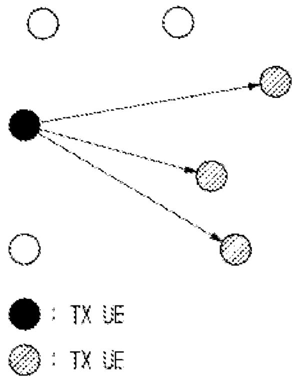

FIGS. 6A to 6C illustrate three cast types applicable to the present disclosure. The embodiment of FIGS. 6A to 6C may be combined with various embodiments of the present disclosure.

Specifically, FIG. 6A exemplifies broadcast-type SL communication, FIG. 6B exemplifies unicast type-SL communication, and FIG. 6C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (Harq) Procedure

SL HARQ feedback may be enabled for unicast. In this case, in anon-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In this specification, HARQ-ACK may be referred to as ACK, ACK information or positive-ACK information, and HARQ-NACK may be referred to as NACK, NACK information or negative-ACK information.

SL Measurement and Reporting

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Sidelink Congestion Control

For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 7:
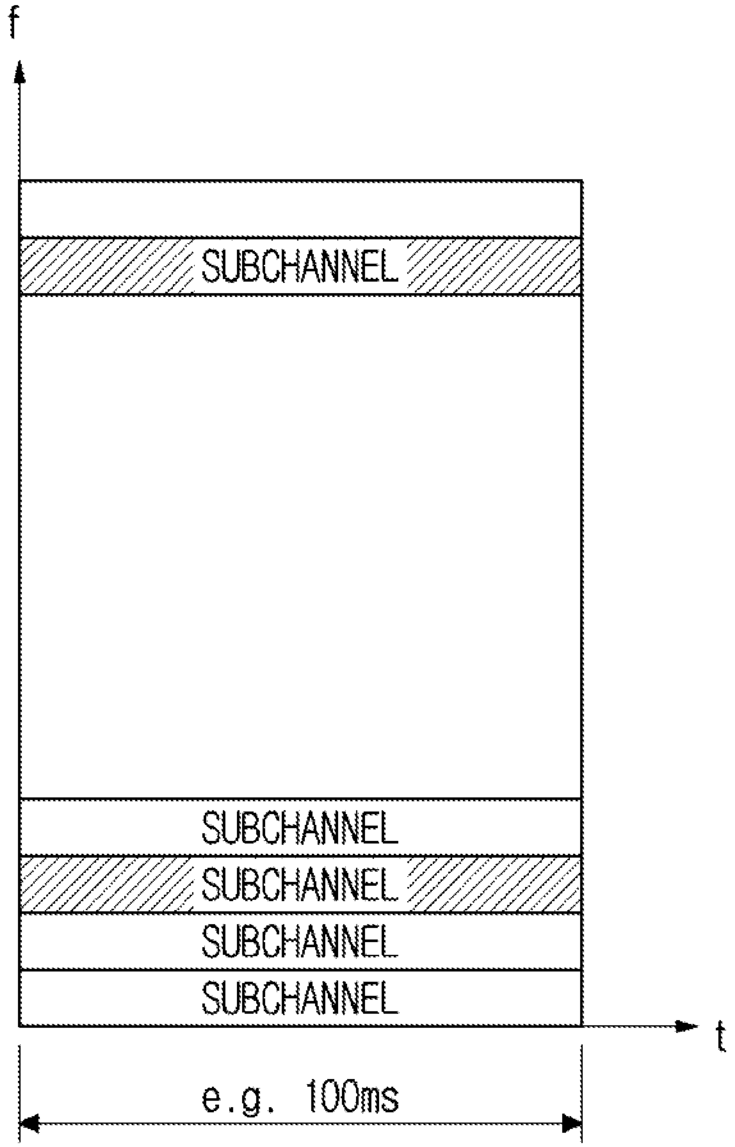
FIG. 7 illustrates resource units for CBR measurement applicable to the present disclosure.

FIG. 7 illustrates resource units for CBR measurement applicable to the present disclosure. The embodiment of FIG. 7 may be combined with various embodiments of the present disclosure.

Referring to FIG. 7, a CBR may refer to the number of subchannels of which the RS SI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 7, on the assumption that the hatched subchannels have values greater than or equal to a predetermined threshold, the CBR may refer to a ratio of hatched subchannels for a time period of 100 ms. In addition, the UE may report the CBR to the BS.

For example, when a PSCCH and a PSSCH are multiplexed in a frequency domain, the UE may perform one CBR measurement in one resource pool. When PSFCH resources are configured or preconfigured, the PSFCH resources may be excluded from the CBR measurement.

Further, there may be a need for performing congestion control in consideration of the priority of traffic (e.g., a packet). To this end, for example, the UE may measure a channel occupancy ratio (CR). Specifically, the UE may measure a CBR and determine a maximum value CRlimitk of a CR k (CRk) available for traffic corresponding to each priority (e.g., k) according to the CBR. For example, the UE may derive the maximum value CRlimitk of the channel occupancy ratio for the priority of traffic, based on a predetermined table of CBR measurements. For example, for relatively high-priority traffic, the UE may derive a relatively large maximum value of a channel occupancy ratio. Thereafter, the UE may perform congestion control by limiting the sum of the channel occupancy ratios of traffic with priorities k lower than i to a predetermined value or less. According to this method, a stricter channel occupancy ratio limit may be imposed on relatively low-priority traffic.

Besides, the UE may perform SL congestion control by using a scheme such as transmission power adjustment, packet dropping, determination as to whether to retransmit, and adjustment of a transmission RB size (MCS adjustment).

An example of SL CBR and SL RSSI is as follows. In the description below, a slot index may be based on a physical slot index.

SL CBR measured in a slot n is defined as portion of subchannels in which SL RSSI measured by a UE within a resource pool, sensed over CBR measurement window [n−a, n−1], exceeds a (pre)set threshold. Here, according to a higher layer parameter timeWindowSize-CBR, a is equal to 100 or $100 \cdot 2\mu$ slots. SL CBR may be applied to RRC_IDLE intra-frequency, RRC_IDLE inter-frequency, RRC_CONNECTED intra-frequency and RRC_CONNECTED inter-frequency.

SL RSSI is defined as a linear average of a total receive power ([W] unit) observed in a configured subchannel in OFDM symbols of a slot configured for a PSCCH and a PSSCH starting from a second OFDM symbol. For FR1, a reference point for SL RSSI shall be an antenna connector of a UE. For FR2, SL RSSI shall be measured based on a combined signal from antenna elements corresponding to a given receiver branch. For FR1 and FR2, if receive diversity is used by a UE, a reported SL RSSI value shall not be less than corresponding SL RSSI of any of individual receiver branches. SL RSSI may be applied to RRC_IDLE intra-frequency, RRC_IDLE inter-frequency, RRC_CONNECTED intra-frequency and RRC_CONNECTED inter-frequency.

An example of an SL CR (Channel occupancy Ratio) is as follows. The SL CR evaluated in a slot n is defined as dividing a total number of subchannels used for transmission in slot [n−a, n−1] and granted in slot [n, n+b] by a total number of subchannels configured in a transmission pool over slot [n−a, n+b]. SL CR may be applied to RRC_IDLE intra-frequency, RRC_IDLE inter-frequency, RRC_CONNECTED intra-frequency and RRC_CONNECTED inter-frequency. Here, a may be a positive integer and b may be 0 or a may be a positive integer. a and b is determined by UE implementation, and $a+b+1=1000$ or $a+b+1=1000\ 2p$ according to higher layer parameter timeWindowSize-CBR. $b<(a+b+1)/2$ and n+b shall not exceed a last transmission opportunity of a grant for current transmission. SL CR is evaluated for each (re)transmission. In evaluating SL CR, according to grant(s) present in slot [n+1, n+b] without packet dropping, a UE shall assume that a transmission parameter used in slot n is reused. A slot index may be a physical slot index. SL CR may be calculated per priority level. If it is a member of a sidelink grant defined in TS 38.321, the resource is treated as granted.

Specific Embodiments of the Present Disclosure

Beamforming could not be considered in V2X communication of an existing communication system (e.g., LTE system). On the other hand, in V2X communication of a new communication system (e.g., NR system), V2X communication considering beamforming may be performed. Here, when communication is performed through beams between terminals based on V2X communication, there is a need to set a beam management and beam refinement method for device-to-device communication.

As a specific example, when mmWave is used in cellular communication, a base station may use a beam having the same beam width in all directions to cover all terminals within a cell radius. However, for example, unlike cellular communication, in mmWave V2X communication, there is a need to flexibly use a beam width in consideration of distances between and locations of terminals. For example, when only beams having the same beam width are used in mmWave V2X communication, the beam may cover an unnecessary region where a terminal is not located, but may not cover a necessary region where a terminal is located. Considering the above points, mmWave V2X communication may require a method of efficiently managing a beam to cover a necessary region, and a method for this will be described below.

Figure 8:
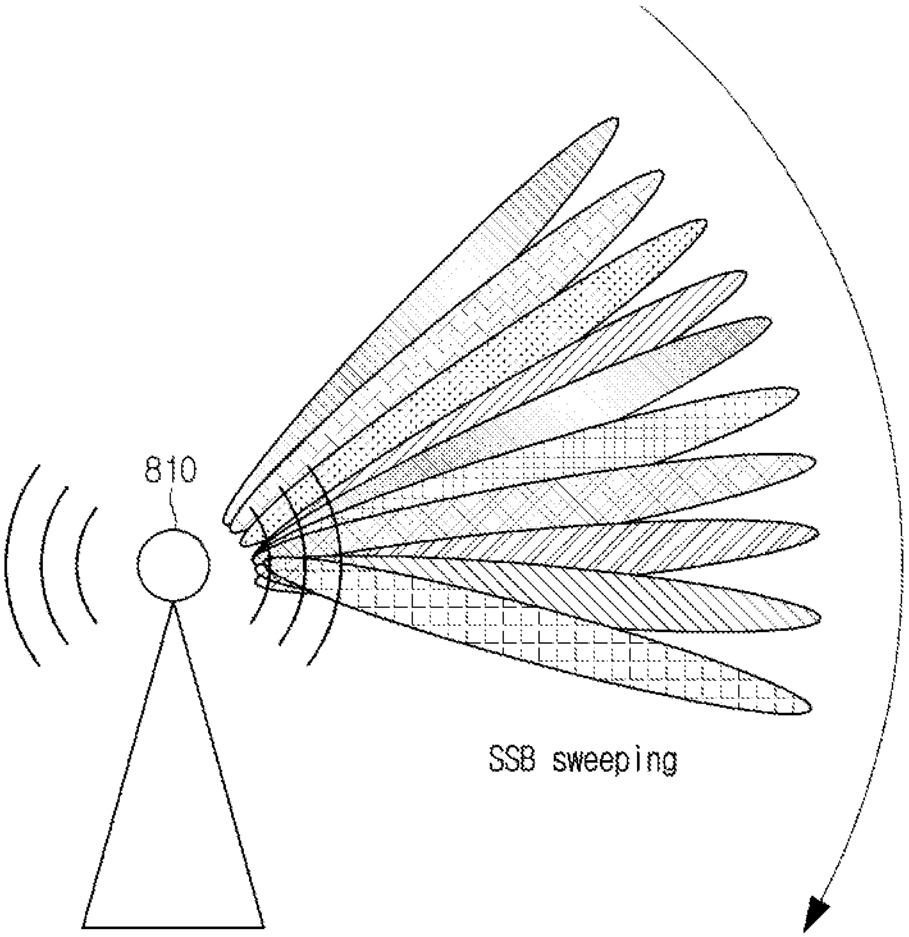
FIG. 8 is a diagram illustrating a method in which a base station transmits a synchronization signal block (SSB) based on sweeping according to an embodiment of the present disclosure.

FIG. 8 is a diagram illustrating a method in which a base station transmits a synchronization signal block (SSB) based on sweeping according to an embodiment of the present disclosure. Referring to FIG. 8, a base station 810 may transmit SSBs through different beams within cell coverage based on an SSB index within an SSB burst. Here, as described above, beams may have the same beam width and may be sequentially transmitted in all directions based on sweeping to cover all terminals within cell coverage. That is, the base station 810 may use beams having the same beam width. Here, as an example, the base station 810 may use a relatively wide beam in an initial beam acquisition process. The base station 810 may transmit the SSB in each direction based on a wide beam. However, the beam width may be the same even in the above-described case. The base station 810 and the terminal may perform coarse beam pairing based on a wide beam. For example, the terminal may perform measurement through a beam transmitted by the base station 810 and select a specific wide beam based on the measurement. Then, the base station 810 and the terminal may perform beam refinement and beam tracking using a narrow beam within a specific wide beam. However, the beam widths of the narrow beams may be set to be the same. For example, the base station 810 may transmit a channel status information-reference signal (CSI-RS) to the terminal through each narrow beam. The terminal may perform measurement on the narrow beam and select a specific narrow beam based on the measurement. In addition, the terminal may perform receive beam sweeping based on a specific beam transmitted by the base station 810 in order to determine the receive beam, and determine the receive beam. After that, the terminal and the base station 810 may perform communication through the determined beam.

Here, when mmWave V2X communication is performed, the beam may be configured as shown in FIG. 8 described above. However, as an example, as the number of beams increases in mmWave communication, overhead may increase in beam sweeping for initial beam pairing and beam tracking after beam pairing. That is, when the number of beams increases, resource allocation for beam transmission increases, and overhead for measurement and reporting operations may increase based on the increased resource allocation. In particular, in mmWave V2X communication, it is possible to smoothly provide services by quickly recognizing a counterpart terminal (or vehicle) in consideration of mobility of the terminal, establishing a connection, and reducing a beam sweeping time. Also, for example, there is a need to frequently use beam tracking based on the mobility of the terminal after the terminal is connected to the counterpart terminal (or vehicle). In this case, when the number of candidate beams for beam tracking increases, the number of beams to be tracked by the terminal may increase. Accordingly, delay may occur and resources used by the terminal may also increase. Considering the above points, a method of reducing the number of candidate beams for beam tracking may be required. Through this, frequency and time resources for beam tracking can be saved, and delay occurrence can be reduced.

Also, as an example, a location change angle between terminals (or between vehicles) in a short distance may be large based on mobility of terminals. That is, as the distance between terminals decreases, a radius that may be covered through the beam may decrease, and accordingly, a probability of occurrence of beam failure may increase. Therefore, when the distance between the terminals is short, the terminal shall perform communication using a beam having a wide beam width to reduce a beam failure probability.

More specifically, when recognizing a counterpart terminal and tracking a beam in mmWave V2X communication, the terminal may manage the beam based on the distance and location of the counterpart terminal. For example, when a terminal performs beam tracking for a counterpart terminal, the terminal may adjust the distance and beam width to cover only a serviceable region in consideration of the distance from the counterpart terminal. That is, based on the service provided in mmWave V2X communication, beam tracking may be efficiently performed by utilizing beams having different beam widths according to the distance between terminals, thereby reducing delay.

Also, as an example, when the terminal performs beam tracking, the terminal may prevent an excessive beam change from occurring by considering the distance of the counterpart terminal. Through this, overhead of beam measurement reference signal transmission, measurement, and reporting can be reduced, and a beam failure probability can also be reduced. In addition, as an example, safety of terminals performing V2X communication may be important based on a distance between the terminals, and safety may be improved by checking the speed and location of the counterpart terminal through the above.

Figure 9:
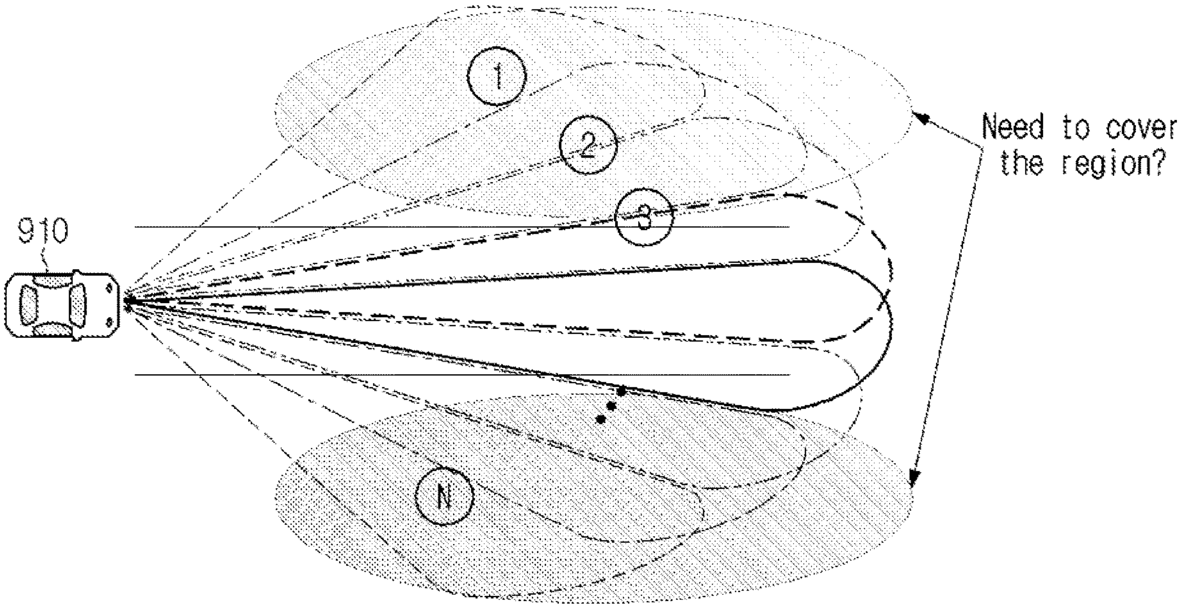
FIG. 9 is a diagram illustrating a method in which a terminal performs beam sweeping and beam tracking based on an existing method according to an embodiment of the present disclosure.
Figure 10:
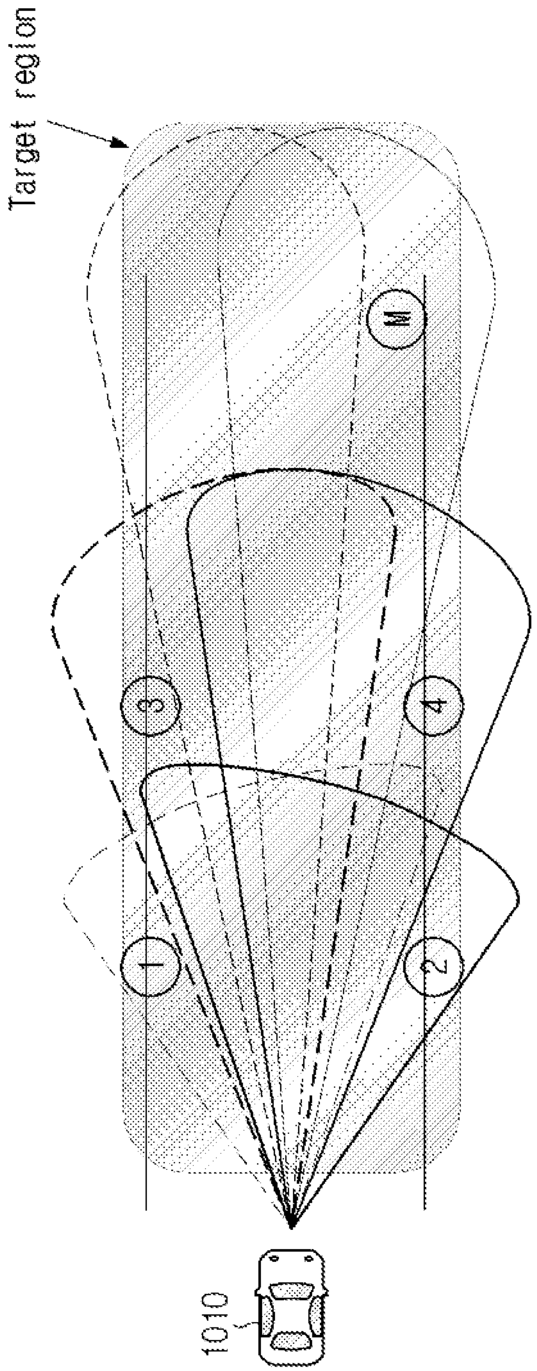
FIG. 10 is a diagram illustrating a method of performing beam sweeping and beam tracking based on a target region according to an embodiment of the present disclosure.

Specifically, FIG. 9 is a diagram illustrating a method in which a terminal performs beam sweeping and beam tracking based on an existing method according to an embodiment of the present disclosure, and FIG. 10 is a diagram illustrating a method of performing beam sweeping and beam tracking based on a target region according to an embodiment of the present disclosure.

Referring to FIG. 9, in mmWave V2X communication, a beam may be managed similarly to cellular communication. For example, beams may have the same beam width, and beam sweeping and beam tracking may be performed based on the entire coverage region. Here, as an example, the entire coverage region may be an angle at which beam sweeping and beam tracking are performed. As a specific example, a terminal 910 may perform beam sweeping in all directions in the same way as the base station. As another example, the terminal 910 may configure the entire coverage region based on a preset angle based on terminal-related information. For example, a preset angle may be set to the entire coverage region in consideration of the direction of movement of the terminal 910. In this case, the beam width and the number of beams may be determined based on a preset angle, and the beam width may be set to be the same.

In this case, as in FIG. 9, a case in which the terminal 910 configures a beam-related configuration without considering the distance of other terminals may be considered. For example, the beam-related configuration may include at least one of beam measurement reference signal resource allocation information, measurement-related information, or reporting period information, and the terminal 910 may manage the beam based on the configured beam configuration. In this case, for example, when the distance between the terminal 910 and another terminals is short, sudden and frequent beam changes may occur even with small location changes of the terminal 910 or another terminal. For example, the beam width of one beam may be narrower as it is closer to the terminal 910 and wider as it is farther away from the terminal 910. That is, when the distance between the terminal 910 and another terminal is short, a beam change may occur frequently. Accordingly, the terminal 910 may frequently perform beam management (measurement/report/application) related operations on multiple beams for beam tracking in consideration of frequent beam changes. On the other hand, when the distance between the terminal 910 and another terminal is long, a region covered by one beam may be widened. Therefore, since the beam change does not occur frequently, a beam configuration based on a short distance may be inefficient. Also, as an example, in the mmWave V2X service, a use case in which communication is performed only for a certain region (e.g., for vehicles in 1 to 2 left and right lanes centered on its own lane) without communication for all regions may be considered. Therefore, when a beam having the same beam width is configured based on a beam formed based on a maximum communication distance in a straight line between the terminal 910 and another terminal, the beam may be unnecessary depending on the region where the other terminal is located. Here, as in FIG. 9, if the terminal 910 manages a beam based on the same beam width, there may be limitations in efficiently performing beam management.

At this time, for example, referring to FIG. 10, beam management may be performed as a method for solving the above-described problem. More specifically, a target region may be set in consideration of beam management. In this case, the target region may be divided based on a preset value based on the distance between a terminal 1010 and a counterpart terminal. For example, the beam width may be determined differently in consideration of the target region. For example, when a terminal receiving a beam sets a constant beam detection requirement regardless of the distance, the terminal 1010 may use beams having different beam widths. Through this, the terminal 1010 may use a small number of beams as a whole, and overhead and a beam failure probability may be reduced.

Figure 11:
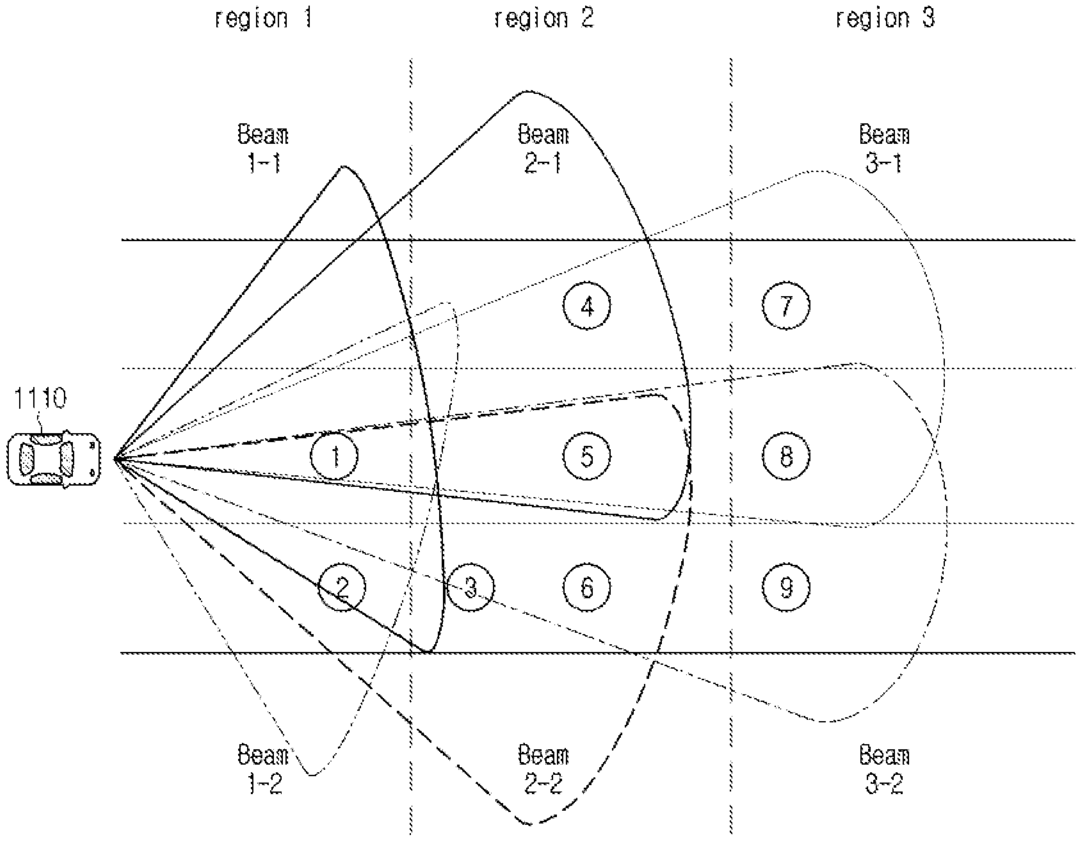
FIG. 11 is a diagram illustrating a method of configuring a beam by dividing a region based on a preset distance according to an embodiment of the present disclosure.

As a more specific example, Table 3 below shows a method of setting a target region based on a straight-line distance between vehicles in the same lane and determining a beam width and the number of beams based on the beam width according to the target region. FIG. 11 is a diagram illustrating a method of configuring a beam by dividing a region based on a preset distance according to an embodiment of the present disclosure. For example, referring to Table 3 below, the target region may be determined based on a straight-line distance between vehicles in the same lane. However, the target region may be determined by a different method, and may not be limited to a specific embodiment.

For example, a method of setting a target region or a straight-line distance value between vehicles in the same lane for determining the target region may be determined differently. For example, target region information may be included in a beam-related configuration configured to perform V2X communication with a terminal 1110. Here, the target region information may include each target region and beam width and beam number information based on the target region as shown in Table 3 below. As another example, the target region setting method may be set to one of preset methods, and the terminal may recognize a plurality of methods in advance. Here, the target region information included in the beam-related configuration may be index information. For example, when the terminal 1110 operates based on a base station scheduling mode (mode 1), the terminal 1110 receives beam-related configuration information through downlink control information (DCI) and manage beams based on the received information. In this case, as an example, DCI may include index information as target region information. In this case, the terminal may set the target region and beam width and beam number information based on the target region using a target region setting method corresponding to the index of the target region information, and is not limited to a specific embodiment.

For example, when a distance of approximately 100 m is configured as a target region for three lanes (one lane of each of the front and left/right), the necessary beam width and number of beams based on the target region may be set as shown in Table 3. For example, the unit of the beam width may be set to a minimum of 6 degrees and may be set in a manner of increasing by 2 times, but may not be limited to the above-described embodiment.

TABLE 3

| Region | Straight-line distance between vehicles in the same lane | Beam width | # of beams per beam width |
|---|---|---|---|
| — | 1~3.1 | Omni | 1 |
| 0 | 3.2~12.5 | 48° | 4 |
| 1 | 12.6~25 | 24° | 2 |
| 2 | 26~50 | 12° | 2 |
| 3 | 51~X (>100) | 6° | 2 |

At this time, referring to FIG. 11, the terminal 1110 may perform beam sweeping based on Regions 1 to 3. For example, three types of beam widths are set based on Table 3 described above, and the service region may be covered by two beams for each beam width. However, this is only one example and is not limited to the above-described embodiment.

For example, Beams 1-1 and 1-2 are set as beams having a first angle in consideration of Region 1, Beams 2-1 and 2-2 are beams having a second angle in consideration of Region 2, and Beams 3-1 and 3-2 may be set as beams having a third angle in consideration of Region 3. In this case, the first angle may be greater than the second angle, and the second angle may be greater than the third angle. That is, a beam width of a beam considering a region close to the terminal 1110 may be set wider. Here, the terminal 1110 may perform discovery of a counterpart terminal while sweeping the beam. For example, the terminal 1110 may perform beam sweeping in the order of Beam 1-1, Beam 1-2, Beam 2-1, Beam 2-2, Beam 3-1, and Beam 3-2. That is, beam sweeping may be performed based on beams having unequal beam widths differently from the conventional method. When beam sweeping is performed based on the foregoing, the total number of beams may be smaller than before, and based on this, it is possible to quickly perform a search for a counterpart terminal by reducing the time required to sweep all beams based on this. Here, as an example, a beam covering a region N may be expressed as N-x (x=1 or 2) based on the beam index (1 or 2).

In this case, as an example, referring to Table 4 below, the searched beam may vary according to the location of each counterpart terminal in FIG. 11. Through this, the terminal 1110 may recognize the distance information and location information of the counterpart terminal. For example, in FIG. 11, the counterpart terminal may detect a beam transmitted by the terminal 1110 through sweeping. As a specific example, the terminal 1110 may transmit a synchronization signal (e.g., S-SSB) having an index corresponding to each beam through each beam. At this time, the counterpart terminal may perform measurement on the swept beam and detect a beam having a value greater than or equal to a reference value. After that, the counterpart terminal may feed information on the detected beam (e.g., S-SSB index) back to the terminal 1110, and the terminal 1110 may obtain information on the beam detected by the counterpart terminal to recognize the distance and location of the counterpart terminal. As an example, in FIG. 11, a case in which the counterpart terminal detects all beams transmitted by the terminal 1110 may be considered. That is, when the terminal 1110 receives information on all beams from the counterpart terminal, the terminal 1110 may recognize that the counterpart terminal is located in ①. Also, when the terminal 1110 receives information on Beams 1-2 and 2-2 from the counterpart terminal, the terminal may recognize that the counterpart terminal is located in ②. That is, the terminal 1110 may infer a distance from a beam value of the closest region based on a plurality of pieces of detected beam information. For example, the terminal 1110 may recognize that the counterpart terminal is located in the corresponding region based on the beam index corresponding to the closest region in the detected beam information. In addition, the terminal 1110 may infer a direction from the beam index of the farthest region, and may recognize the distance and location of the counterpart terminal as shown in Table 4 based on the same method.

Through this, the terminal (UE) may reduce the number of candidate beams when performing beam refinement.

TABLE 4

| UE | Detected beams | Region (distance) | location (direction) |
|---|---|---|---|
| 1 | All beams | Region 1 | Same lane |
| 2 | 1-2, 2-2 | Region 1 | Right lane |
| 3 | 2-2 | Region 2 | Right lane |
| 4 | 2-1, 3-1 | Region 2 | Left lane |
| 5 | 2-1, 2-2, 3-1, 3-2 | Region 2 | Same lane |
| 6 | 2-2, 3-2 | Region 2 | Right lane |
| 7 | 3-1 | Region 3 | Left lane |
| 8 | 3-1, 3-2 | Region 3 | Same lane |
| 9 | 3-2 | Region 3 | Right lane |

Also, for example, in beam refinement and beam tracking, a beam having a narrower width than a beam used for discovery may be used to obtain a higher data rate by increasing signal quality. That is, as shown in FIG. 8 described above, a wide beam may be used for beam detection, and a narrow beam may be used for beam refinement and beam tracking. In this case, as an example, as described above, in beam refinement and beam tracking using a narrow beam, a method having different beam widths according to a distance may be used, but may not be limited to a specific method. Here, as an example, a CSI-RS may correspond to each narrow beam used for beam refinement and beam tracking. That is, the terminal may transmit the CSI-RS to the counterpart terminal through each narrow beam. The counterpart terminal may perform beam refinement and beam tracking through measurement based on the CSI-RS, and is not limited to the above-described embodiment.

Figure 12:
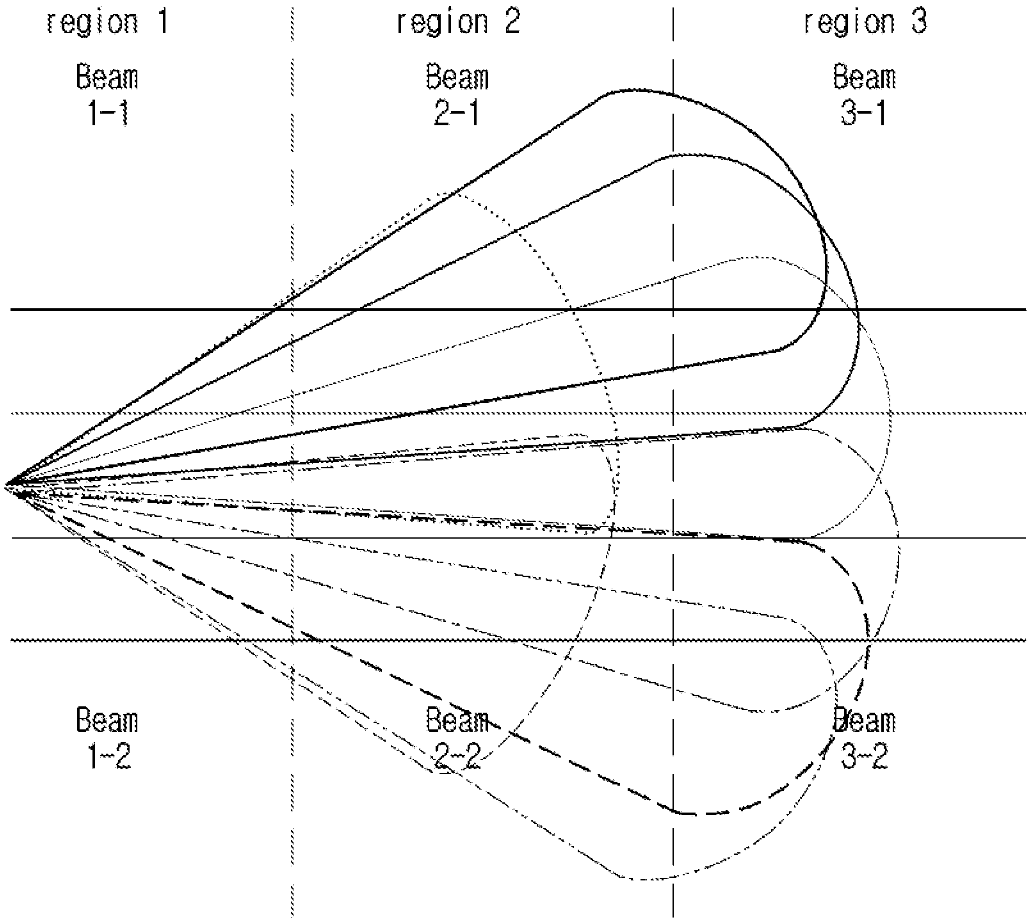
FIG. 12 is a diagram illustrating a method of configuring a beam for beam refinement and beam tracking according to an embodiment of the present disclosure.

Also, as an example, FIG. 12 is a diagram illustrating a method of configuring a beam for beam refinement and beam tracking according to an embodiment of the present disclosure. For example, as described above, a terminal may obtain distance information and location information of a counterpart terminal based on sweeping of beams having different beam widths and beam directions. For example, in FIG. 12, when the terminal recognizes that the counterpart terminal is located in Region 2 based on the above, the terminal may use a beam used in Region 3 to perform beam refinement and beam tracking. That is, the terminal may use Beams 3-1 and 3-2 for Region 3 for beam refinement and beam tracking for a counterpart terminal located in Region 2. However, the entire region may not be covered only by Beams 3-1 and 3-2. Accordingly, beams having the same beam width as Beam 3-1 and Beam 3-2 may be added in the left/right direction.

Also, for example, tracking beams in Region 1 and other regions may be generated in the above-described manner. That is, for a terminal detected in Region n, a discovery beam of Region n+1 may be used for beam refinement and beam tracking.

Here, as an example, in the case of a region corresponding to the farthest distance, a beam used for beam refinement and beam tracking may be set to a beam having a narrower width than that of the discovery beam. Accordingly, a larger number of beams may be generated and used. As another example, in the case of a region corresponding to the farthest distance, the same beam as the discovery beam may be used as a beam used for beam refinement and beam tracking, but is not limited to the above-described embodiment.

Figure 13:
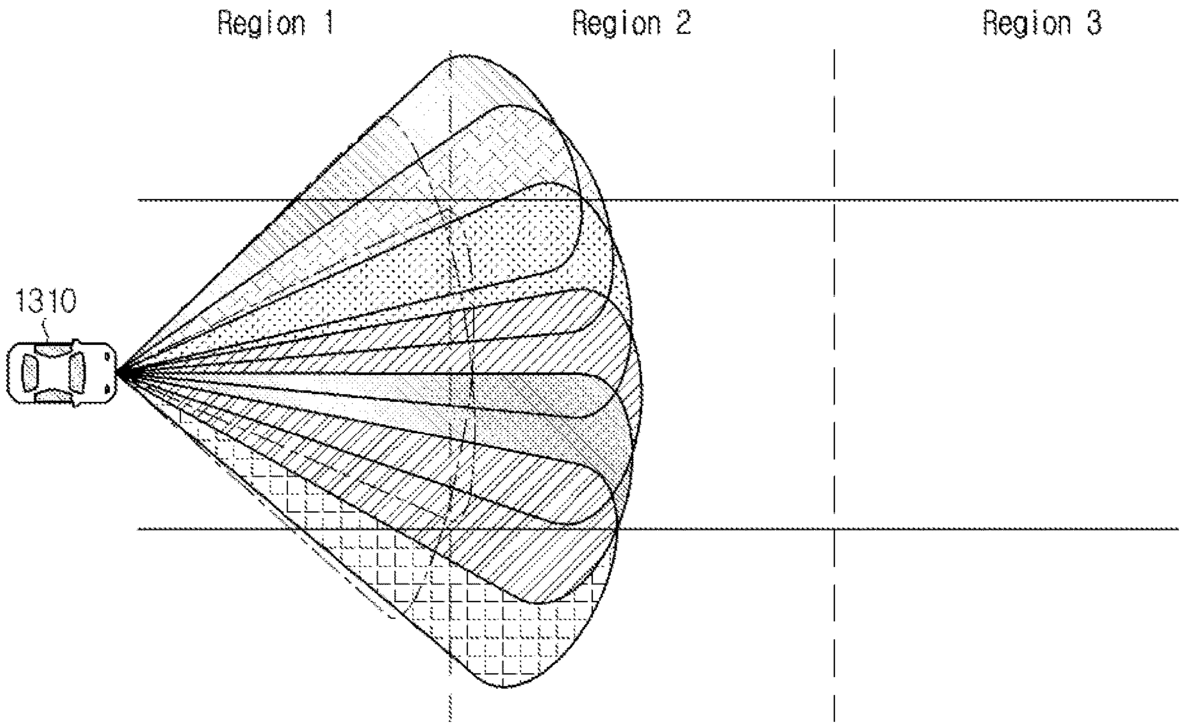
FIG. 13 is a diagram illustrating a method of using a different type of beam from a discovery beam in beam refinement and beam tracking according to an embodiment of the present disclosure.
Figure 14:
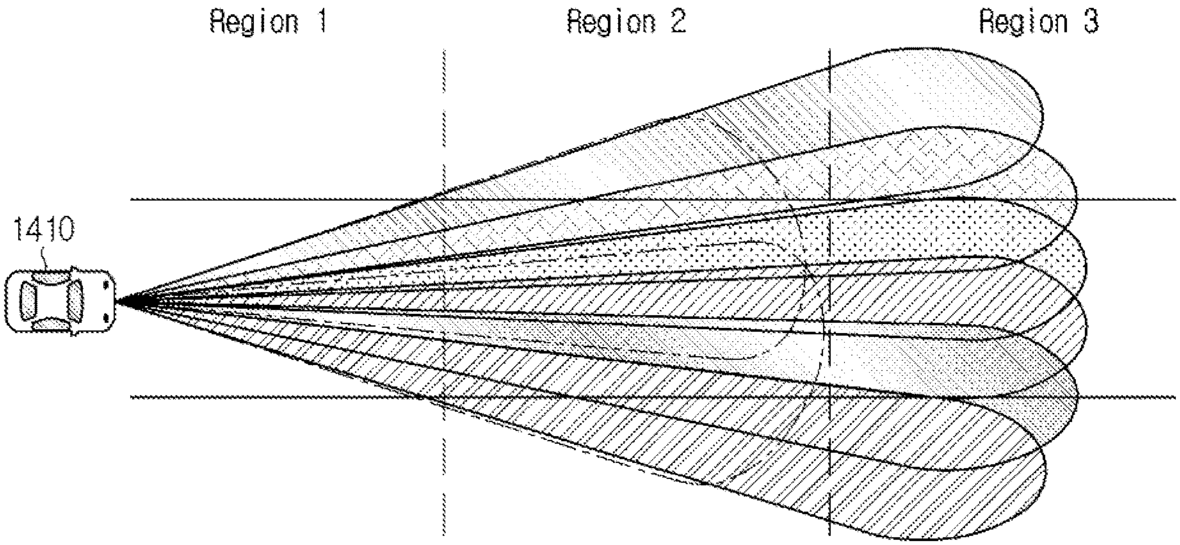
FIG. 14 is a diagram illustrating a method of using a different type of beam from a discovery beam in beam refinement and beam tracking according to an embodiment of the present disclosure.

As another example, FIGS. 13 and 14 are diagrams illustrating a method of using a different type of beam from a discovery beam in beam refinement and beam tracking according to an embodiment of the present disclosure.

Referring to FIG. 13, when a counterpart terminal is located in Region 1, a terminal 1310 may use a different type of beam from the discovery beam in Region 2. That is, the terminal 1310 may not use a beam width corresponding to a discovery beam in the next region for beam refinement and beam tracking. For example, the terminal 1310 may determine and use the beam width based on the distance from the counterpart terminal. The terminal 1310 may set a region in a different way from the region set for discovery of the counterpart terminal, and perform beam refinement and beam tracking. For example, considering that the terminal 1310 uses a narrow beam in beam refinement and beam tracking, a subdivided region may be set compared to the discovery process. Here, beams having different beam widths may be configured for each region. Also, as an example, the beam may be configured as a tracking beam set in consideration of each region, and through this, efficient beam management may be performed.

As a specific example, when the counterpart terminal is located in ⑤ in FIG. 11 described above, the terminal may recognize that the counterpart terminal is located in the same lane as Region 2 through beam sweeping in the discovery step. At this time, the terminal may utilize the above-described information for beam refinement and beam tracking. For example, referring to FIG. 14, the terminal 1410 may perform refinement and tracking on two beams corresponding to the same lane among tracking beams corresponding to Region 2. After that, the terminal may enable candidate beams for tracking to include some of the tracking beams in Region 2 (e.g., currently paired beams and 1 or 2 neighboring beams) and some of the tracking beams in the adjacent region. For example, in consideration of the fact that the distance between the terminal 1410 and the counterpart terminal may change based on the movement of the terminal 1410 and the counterpart terminal, the terminal 1410 may configure a candidate beam for tracking as described above.

As described above, when a terminal adjusts the beam width of a beam used for beam refinement and beam tracking in consideration of the distance of the counterpart terminal, a wide beam width may be used in beam refinement and beam tracking for a counterpart terminal having a relatively short distance, and a narrow beam width may be used in beam refinement and beam tracking for a relatively long distance. Through this, the terminal may be able to perform beam refinement and beam tracking operations having a similar period for each region, and may be able to set a longer period than the conventional method. Through the above, the terminal may configure a beam to cover only the target region to secure certain performance, and may reduce overhead by reducing a beam change.

Also, as an example, FIG. 15 is a diagram illustrating a method of configuring beams having different beam widths based on a distance according to an embodiment of the present disclosure. As an example, FIG. 15 may show a case where three lanes (front and left and right lanes) are targeted based on the above description. As an example, when managing a beam having a fixed beam width of 6° as shown in FIG. 15, the minimum number of beams (16 (=90/6)) may be necessary to cover 90° (left/right 45°). However, the fixed beam width may be set to a different value, and may not be limited to the above-described embodiment.

On the other hand, as described above, in the case of managing beams having different beam widths based on the distance, two beams are used when the beam widths are 6°, 12°, and 24°, and four (or five) beams may be used when the beam width is 48°. That is, the number of beams managed based on the above may be reduced to 10 or 11, thereby reducing delay and increasing beam management efficiency. Here, as an example, when the operating frequency increases, the terminal may obtain beamforming gain by using more array antennas. At this time, the beam width may be narrower and the number of beams may increase. Therefore, when the operating frequency increases, the beams may be efficiently managed by managing beams having different beam widths as described above. As a specific example, a beam may be managed based on the above-described method not only in mmWave communication but also in terahertz (THz) communication, and may not be limited to a specific form.

Figure 16:
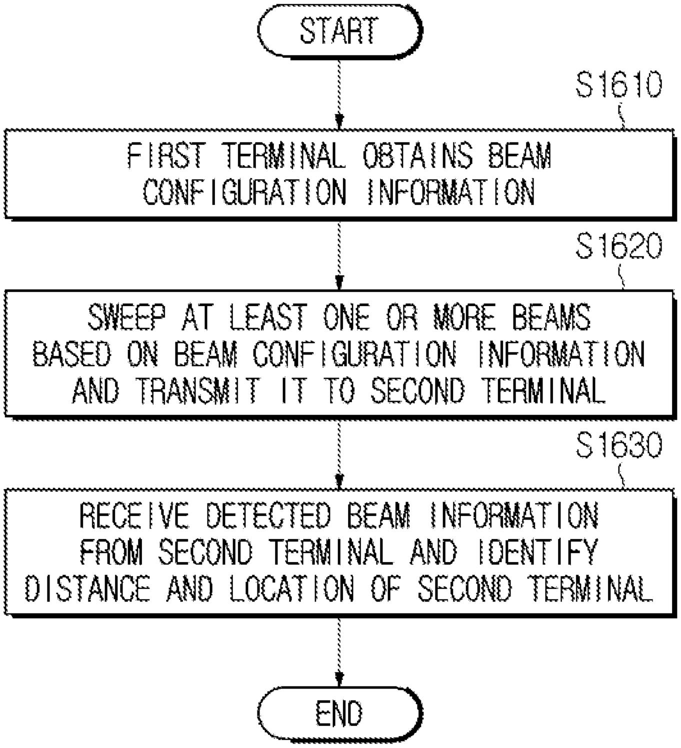
FIG. 16 is a flowchart illustrating a method in which a terminal transmits a beam to another terminal based on a target region according to an embodiment of the present disclosure.

FIG. 16 is a flowchart illustrating a method in which a terminal transmits a beam to another terminal based on a target region according to an embodiment of the present disclosure. Referring to FIG. 16, a first terminal may obtain beam configuration information (S1610). As an example, the beam configuration information may include at least one of beam measurement reference signal resource allocation information, measurement related information or reporting period information, and the first terminal may manage the beam based on the configured beam configuration. Also, as an example, beam configuration information may include information related to a target region, as described above. Then, the first terminal may sweep at least one beam based on the beam configuration information and transmit it to a second terminal. (S1620) At this time, at least one beam transmitted by the first terminal may be configured based on the target region. For example, the target region may be divided into a plurality of regions based on the distance from the first terminal, and the beam width and number of beams corresponding to each region may be determined. As a more specific example, a case in which the beam width of a first region among the plurality of regions is determined to be a first value and the beam width of a second region is determined to be a second value may be considered. In this case, when the first region is closer to the first terminal than the second region, a first value may be set to a value greater than a second value. That is, the beam width for a region close to the first terminal may be set wider. Thereafter, the first terminal may receive detected beam information from the second terminal to identify the distance and location of the second terminal (S1630). At this time, as an example, when the second terminal detects at least one or more beams transmitted by the first terminal based on initial beam configuration or beam failure recovery, the second terminal may perform measurement on each of at least one or more beams transmitted by the first terminal through sweeping. The second terminal may obtain measurement value information of each beam and transmit the measurement value information of each of at least one or more beams to the first terminal as detected beam information. In this case, the first terminal may recognize the distance and location of the second terminal based on the detected beam information, which may be as shown in FIG. 11. Also, as an example, the second terminal may transmit measurement value information of all beams to the first terminal at once based on the beam sweeping period. That is, the second terminal may perform all measurements on the swept beam and transmit all measurement value information to the first terminal so that the first terminal recognizes the distance and location of the second terminal.

In addition, as an example, a discovery beam set used by the first terminal and the second terminal for initial beam configuration and a tracking beam set used for beam refinement and beam tracking after connection between the first terminal and the second terminal may be configured differently.

For example, the beam width and the number of beams for each of the discovery beam set and the tracking beam set may be determined differently for each of a plurality of regions within the target region. As a specific example, a case where the beam width of the discovery beam set for the first region among the plurality of regions is determined to be a first value and the beam width of a discovery beam set for the second region which is the next region of the first region based on the distance from the first terminal may be determined to be a second value may be considered. In this case, the beam width of the tracking beam set for the first region may be determined to be a second value. That is, the tracking beam set is determined to have the same beam width as the discovery beam set, and the tracking beam set in the corresponding region may use the discovery beam set in the far next region. Here, a beam having the same beam width may be added in consideration of a region not covered by the beam width of the next discovery beam set. That is, the number of beams of the tracking beam set of the first region may be set to be greater than the number of beams of the discovery beam set of the second region. Also, as an example, since the next region is not present, the tracking beam set for the farthest region among the target regions may be set to be the same as the discovery beam set.

As another example, the tracking beam set may be set to be divided into subdivided regions based on the region of the discovery beam set. That is, the tracking beam set may be further divided into subdivided regions in the existing region of the discovery beam set, and a beam having a new beam width corresponding to each region may be added. As another example, the tracking beam set may be configured with a new beam width by newly setting a separate subdivided region, and is not limited to a specific embodiment.

Also, as an example, when beam refinement is performed after the first terminal and the second terminal are connected based on a beam discovery procedure, the first terminal may reduce the number of candidate beams of the tracking beam based on distance and location (or direction) information of the second terminal. For example, the first terminal may perform beam refinement and beam tracking by using some of the discovery beams corresponding to the above-mentioned region and some of the discovery beams corresponding to the next region as candidate beams.

As another example, when beam refinement or beam tracking is performed, candidate beams may include beams before and after the corresponding region as well as beams having a currently selected beam width, as described above.

As another example, after the first terminal and the second terminal are connected, in a beam tracking process, distance and speed (relative speed) information of the counterpart terminal (or vehicle) may be obtained based on a result of changing the tracking beam. For example, since the beam width is determined differently according to each region as described above, the distance may be recognized according to the beam width. At this time, the first terminal may identify a rate of a change to a beam having a different beam width. That is, the first terminal may obtain relative speed information of the second terminal, which is the counterpart terminal, based on the beam width change rate and the distance information of each region. As another example, when a beam is managed, different periods may be set according to each beam width. For example, the beam measurement reference signal configuration, beam measurement, and beam reporting period may be set differently according to distance (subdivided region) and speed, and are limited to specific embodiments.

Also, as an example, when a terminal uses a plurality of RF panels, regions to be covered by the panels may be set differently. That is, different beam widths and different number of beams may be generated and managed for each panel. As another example, the above-described beam management may be independently performed for each target terminal or service, and is not limited to a specific embodiment.

Figure 17:
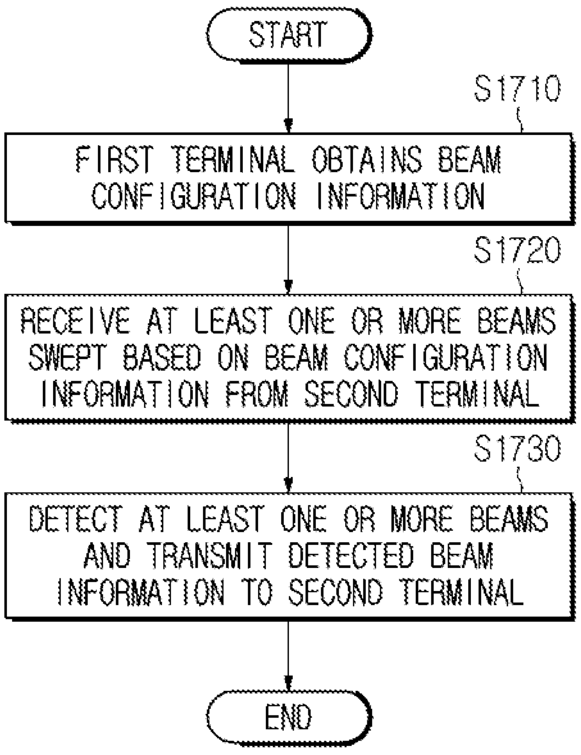
FIG. 17 is a flowchart illustrating a method in which a terminal receives a beam from another terminal according to an embodiment of the present disclosure.

FIG. 17 is a flowchart illustrating operation of a terminal receiving a beam according to an embodiment of the present disclosure. Referring to FIG. 17, a first terminal may obtain beam configuration information (S1710). As an example, the beam configuration information may include at least one of beam measurement reference signal resource allocation information, measurement related information, or reporting period information. and the first terminal may manage the beam based on the configured beam configuration. Also, as an example, the beam configuration information may include information related to a target region, as described above. Then, the first terminal may receive at least one or more beams swept based on the beam configuration information from a second terminal. (S1720). At this time, at least one or more beams received by the first terminal may be configured based on the target region. For example, the target region may be divided into a plurality of regions based on the distance from the second terminal transmitting the beam, and the beam width and number of beams corresponding to each region may be determined. As a more specific example, a case in which the beam width of a first region among the plurality of regions is determined to be a first value and the beam width of a second region is determined to be a second value may be considered. In this case, when the first region is closer to the second terminal than the second region, the first value may be set to a value greater than the second value. That is, the beam width for a region close to the second terminal may be set wider. Then, the first terminal may detect at least one or more beams received from the second terminal and transmit detected beam information to the second terminal (S1730). At this time, as an example, when the first terminal detects at least one or more beams transmitted by the second terminal based on initial beam configuration or beam failure recovery, the first terminal may perform measurement on each of the at least one or more beams transmitted by the second terminal through sweeping. The first terminal may obtain measurement value information of each beam and transmit the measurement value information for each of at least one or more beams to the second terminal as detected beam information. At this time, the second terminal may recognize the distance and location of the first terminal based on the detected beam information, which may be as shown in FIG. 11. Also, as an example, the first terminal may transmit measurement value information of all beams to the second terminal at once based on the beam sweeping period. That is, the first terminal may perform measurement on all of the swept beams and transmit all measurement value information to the second terminal so that the second terminal may recognize the distance and location of the first terminal, which is as described above.

Systems and Various Devices to which Embodiments of the Present Disclosure are Applicable Various embodiments of the present disclosure may be mutually combined.

Hereinafter, an apparatus to which various embodiments of the present disclosure is applicable will be described. Although not limited thereto, various descriptions, functions, procedures, proposals, methods, and/or flowcharts disclosed herein may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 18:
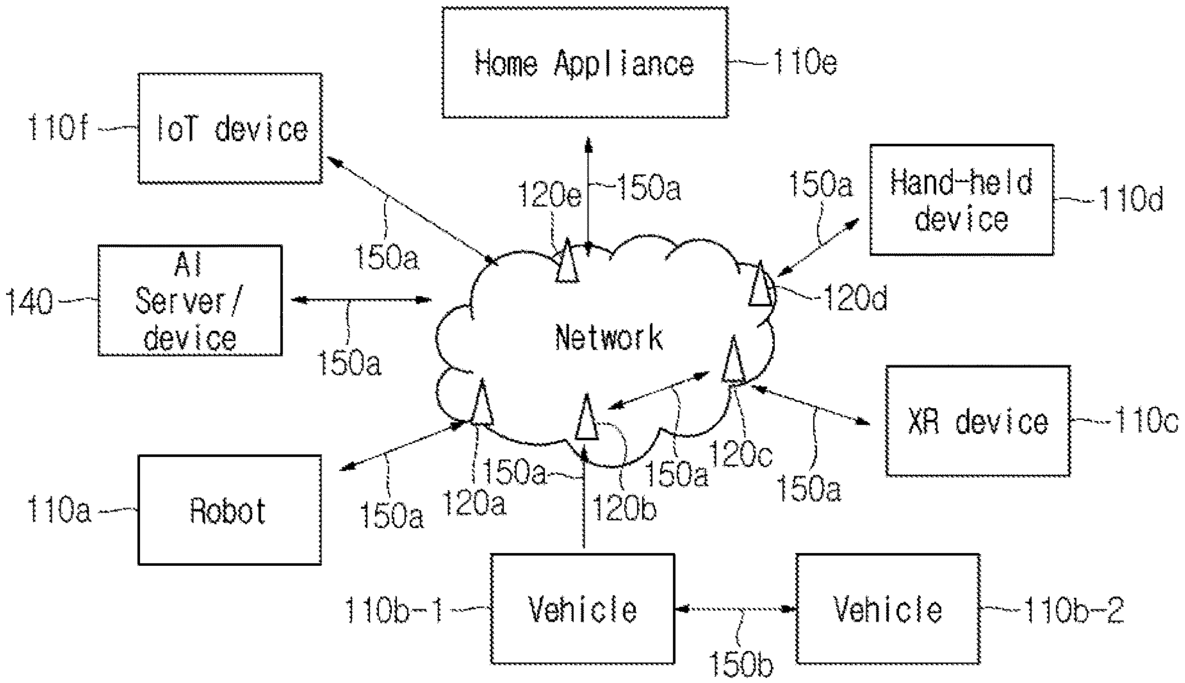
FIG. 18 illustrates a communication system according to an embodiment of the present disclosure.

FIG. 18 illustrates a communication system according to an embodiment of the present disclosure. The embodiment of FIG. 18 may be combined with various embodiments of the present disclosure.

Referring to FIG. 18, the communication system applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include at least one of a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120*a* to 120*e* network may be implemented by a wireless device, and a specific wireless device 120*a* may operate as a base station/network node for another wireless device.

Here, the wireless communication technology implemented in the wireless devices 110*a* to 110*f* of the present specification may include a narrowband Internet of Things for low-power communication as well as LTE, NR, and 6G. At this time, for example, NB-IoT technology may be an example of LPWAN (Low Power Wide Area Network) technology, may be implemented in standards such as LTE Cat NB1 and/or LTE Cat NB2, and is not limited to the above-described names. Additionally or alternatively, the wireless communication technology implemented in the wireless devices 110*a* to 110*f* of the present specification may perform communication based on LTE-M technology. In this case, as an example, the LTE-M technology may be an example of an LPWAN technology, and may be called by various names such as enhanced machine type communication (eMTC). For example, LTE-M technology may be implemented in at least one of 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 110*a* to 110*f* of the present specification may include at least one of ZigBee, Bluetooth, and Low Power Wide Area Network (LPWAN) in consideration of low power communication, and is not limited to the above-described names. For example, the ZigBee technology may create PAN (personal area networks) related to small/low-power digital communication based on various standards such as IEEE 802.15.4, and may be called by various names.

The wireless devices 100*a* to 100*f* may be connected to the network through the base station 120. AI technology is applicable to the wireless devices 100*a* to 100*f*, and the wireless devices 100*a* to 100*f* may be connected to the AI server 100*g* through the network. The network may be configured using a 3G network, a 4G (e.g., LTE) network or a 5G (e.g., NR) network, etc. The wireless devices 100*a* to 100*f* may communicate with each other through the base stations 120*a* to 120*e* or perform direct communication (e.g., sidelink communication) without through the base stations 120*a* to 120*e*. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Wireless communications/connections 150*a*, 150*b* and 150*c* may be established between the wireless devices 100*a* to 100*f*/the base stations 120*a* to 120*e* and the base stations 120*a* to 120*e*/the base stations 120*a* to 120*e*. Here, wireless communication/connection may be established through various radio access technologies (e.g., 5G NR) such as uplink/downlink communication 150*a*, sidelink communication 150*b* (or D2D communication) or communication 150*c* between base stations (e.g., relay, integrated access backhaul (IAB). The wireless device and the base station/wireless device or the base station and the base station may transmit/receive radio signals to/from each other through wireless communication/connection 150*a*, 150*b* and 150*c*. For example, wireless communication/connection 150*a*, 150*b* and 150*c* may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Figure 19:
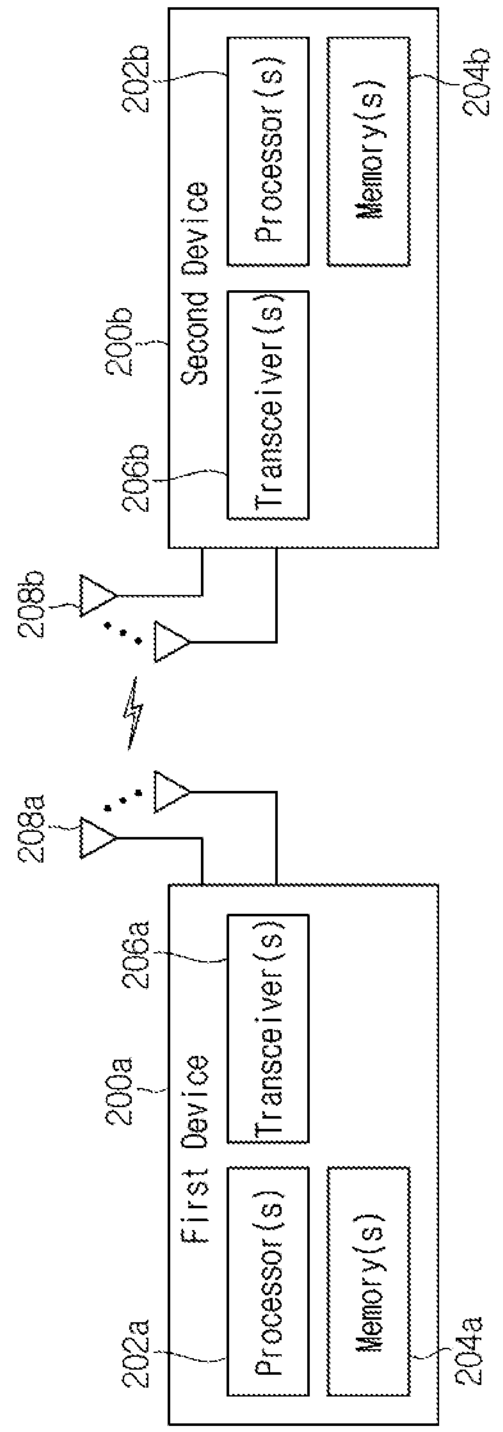
FIG. 19 illustrates a wireless device according to an embodiment of the present disclosure.

FIG. 19 illustrates a wireless device according to an embodiment of the present disclosure. The embodiment of FIG. 19 may be combined with various embodiments of the present disclosure.

Referring to FIG. 19, a first wireless device 200*a* and a second wireless device 200*b* may transmit and receive radio signals through various radio access technologies (e.g., LTE or NR). Here, {the first wireless device 200*a*, the second wireless device 200*b*} may correspond to {the wireless device 100*x*, the base station 120} and/or {the wireless device 100*x*, the wireless device 100*x*} of FIG. 1.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein.

The second wireless device 200*b* may perform wireless communications with the first wireless device 200*a* and may include one or more processors 202*b* and one or more memories 204*b* and may further include one or more transceivers 206*b* and/or one or more antennas 208*b*. The functions of one or more processors 202*b*, one or more memories 204*b*, one or more transceivers 206*b*, and/or one or more antennas 208*b* may be similar to those of one or more processors 202*a*, one or more memories 204*a*, one or more transceivers 206*a* and/or one or more antennas 208*a* of the first wireless device 200*a*.

Figure 20:
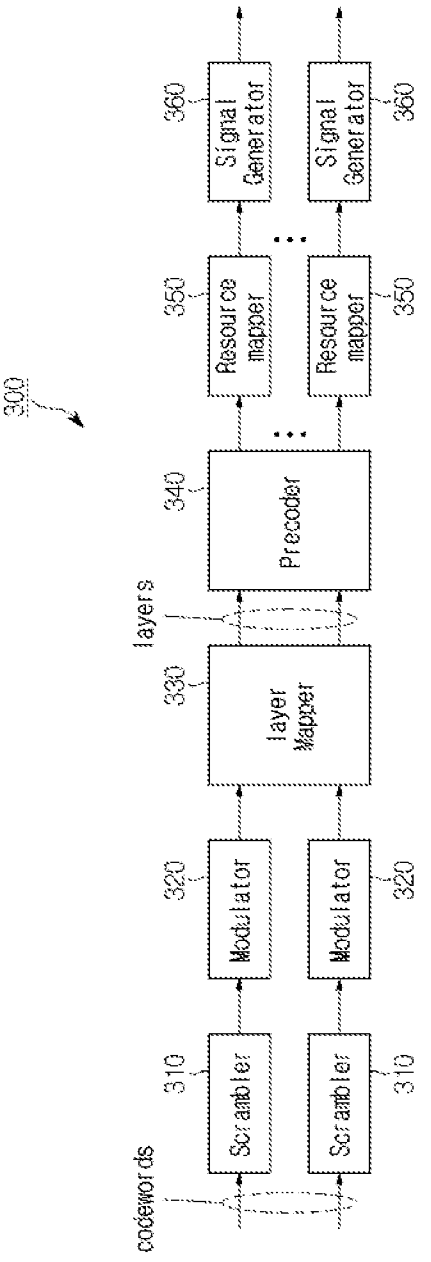
FIG. 20 illustrates a signal process circuit for a transmission signal applicable to the present disclosure.

FIG. 20 illustrates a signal process circuit for a transmission signal applicable to the present disclosure.

Referring to FIG. 20, a signal processing circuit 300 may include scramblers 310, modulators 320, a layer mapper 330, a precoder 340, resource mappers 350, and signal generators 360. For example, an operation/function of FIG. 20 may be performed by the processors 202*a* and 202*b* and/or the transceivers 206*a* and 206*b* of FIG. 19. Hardware elements of FIG. 20 may be implemented by the processors 202*a* and 202*b* and/or the transceivers 36 and 206 of FIG. 19. For example, blocks 310 to 360 may be implemented by the processors 202*a* and 202*b* of FIG. 19. Alternatively, the blocks 310 to 350 may be implemented by the processors 202*a* and 202*b* of FIG. 19 and the block 360 may be implemented by the transceivers 206*a* and 206*b* of FIG. 19, and it is not limited to the above-described embodiment.

Figure 21:
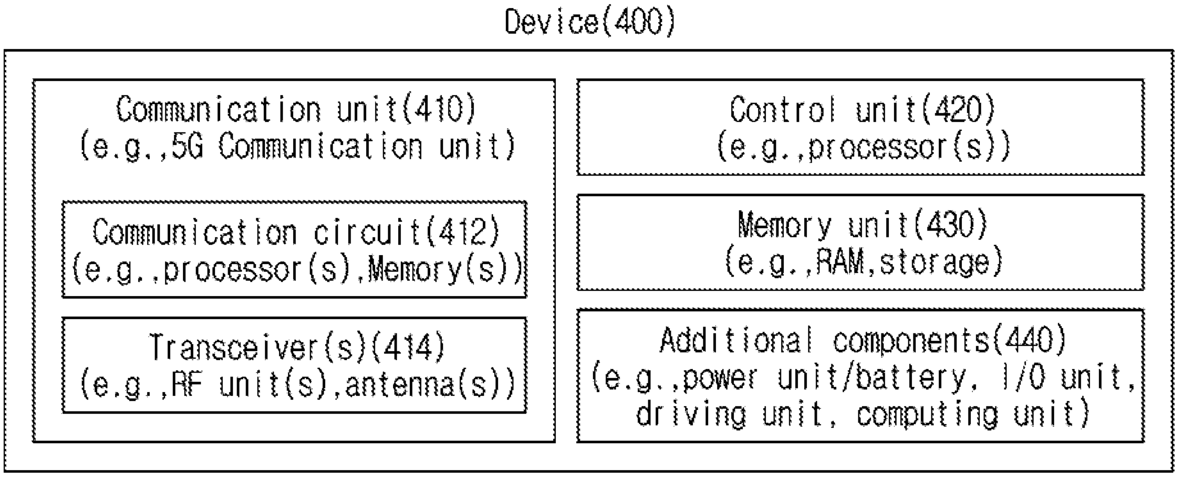
FIG. 21 shows another example of a wireless device according to an embodiment of the present disclosure.

FIG. 21 shows another example of a wireless device according to an embodiment of the present disclosure. FIG. 21 may be combined with various embodiments of the present disclosure.

Referring to FIG. 21, a wireless device 300 corresponds to the wireless devices 200*a* and 200*b* of FIG. 19, and may include various elements, components, units/portions, and/or modules. For example, the wireless device 400 may include a communication unit 410, a control unit 420, a memory unit 430, and an additional component 440.

The communication unit 410 may include a communication circuit 412 and transceiver(s) 414. The communication unit 410 may transmit and receive signals (e.g., data, control signals, etc.) to and from other wireless devices and base stations. For example, the communication circuit 412 may include one or more processors 202*a* and 202*b* and/or one or more memories 204*a* and 204*b* of FIG. 19. For example, the transceiver(s) 414 may include one or more transceivers 206*a* and 206*b* and/or one or more antennas 208*a* and 208*b* of FIG. 19.

The control unit 420 may be composed of a set of one or more processors. For example, the control unit 420 may include a set of a communication control processor, an application processor (AP), an electronic control unit (ECU), a graphic processing processor, a memory control processor, and the like. The control unit 420 is electrically connected to the communication unit 410, the memory unit 430, and the additional component 440, and controls general operations of the wireless device. For example, the controller 420 may control electrical/mechanical operation of the wireless device based on the program/code/command/information stored in the memory unit 430. In addition, the control unit 420 may transmit the information stored in the memory unit 430 to the outside (e.g., another communication device) through the communication unit 410 through a wireless/wired interface, or store, in the memory unit 430, information received from the outside (e.g., another communication device) through the communication unit 410 through a wireless/wired interface.

The memory unit 430 may be composed of a RAM, a DRAM (dynamic RAM), a ROM, a flash memory, a volatile memory, a non-volatile memory and/or a combination thereof. The memory unit 430 may store data/parameters/programs/codes/commands necessary to drive the wireless device 400. Also, the memory unit 430 may store input/output data/information.

The additional component 440 may be variously configured according to the type of the wireless device. For example, the additional component 440 may include at least one of a power unit/battery, an input/output unit, a driving unit, and a computing unit. Although not limited thereto, the wireless device 400 may be implemented in the form of a robot (FIGS. 1, 110*a*), a vehicle (FIGS. 1, 110*b*-1 and 110*b*-2), an XR device (FIGS. 1, 110*c*), and a mobile device (FIGS. 1, 110*d*), home appliance (FIGS. 1, 110*e*), an IoT device (FIGS. 1, 110*f*), a digital broadcasting terminal, a hologram device, a public safety device, an MTC device, a medical device, a fintech device (or financial device), a security device, a climate/environment device, an AI server/device (FIGS. 1, 140), a base station (FIGS. 1, 120), and a network node. The wireless device may be mobile or used in a fixed location according to the use-example/service.

Figure 22:
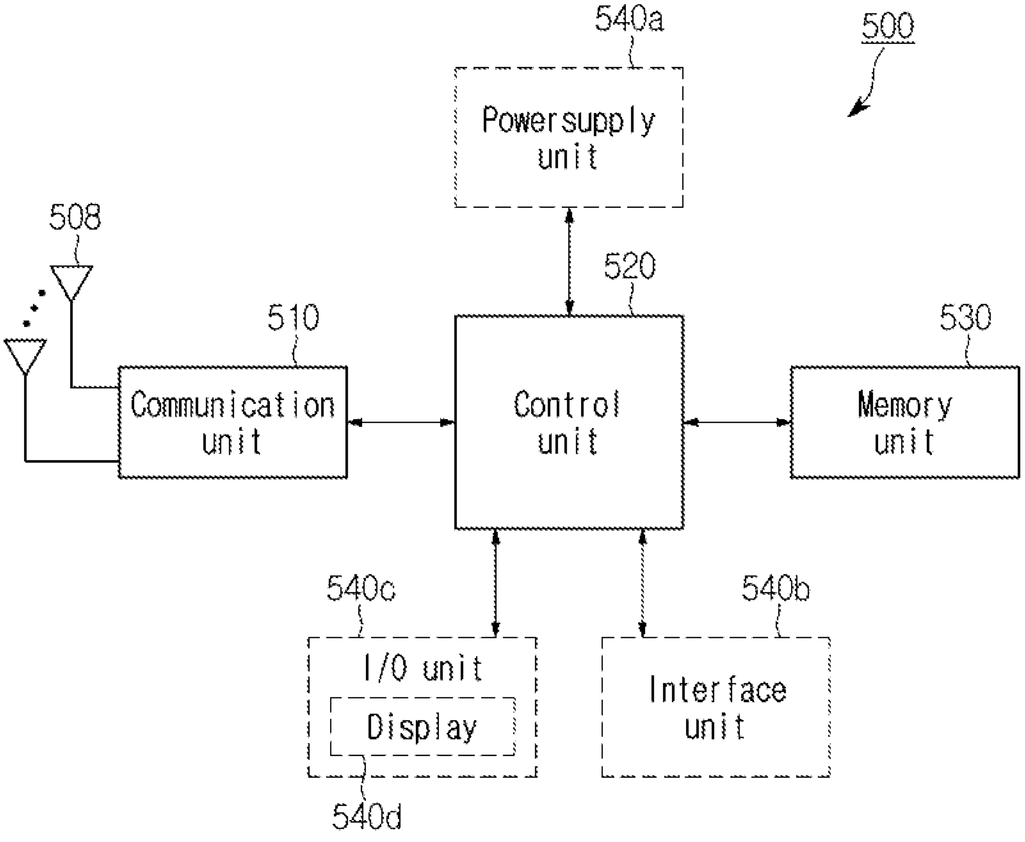
FIG. 22 illustrates a hand-held device applicable to the present disclosure.

FIG. 22 illustrates a hand-held device applicable to the present disclosure. FIG. 22 exemplifies a hand-held device applicable to the present disclosure. The hand-held device may include a smartphone, a smart pad, a wearable device (e.g., a smart watch or smart glasses), and a hand-held computer (e.g., a laptop, etc.). The embodiment of FIG. 22 may be combined with various embodiments of the present disclosure.

Referring to FIG. 22, the hand-held device 500 may include an antenna unit (antenna) 508, a communication unit (transceiver) 510, a control unit (controller) 520, a memory unit (memory) 530, a power supply unit (power supply) 540*a*, an interface unit (interface) 540*b*, and an input/output unit 540*c*. An antenna unit (antenna) 508 may be part of the communication unit 510. The blocks 510 to 530/440*a* to 540*c* may correspond to the blocks 310 to 330/340 of FIG. 35, respectively, and duplicate descriptions are omitted.

The communication unit 510 may transmit and receive signals and the control unit 520 may control the hand-held device 500, and the memory unit 530 may store data and so on. The power supply unit 540*a* may supply power to the hand-held device 500 and include a wired/wireless charging circuit, a battery, etc. The interface unit 540*b* may support connection between the hand-held device 500 and another external device. The interface unit 540*b* may include various ports (e.g., an audio input/output port and a video input/output port) for connection with the external device. The input/output unit 540*c* may receive or output video information/signals, audio information/signals, data and/or user input information. The input/output unit 540*c* may include a camera, a microphone, a user input unit, a display 540*d*, a speaker and/or a haptic module.

Figure 23:
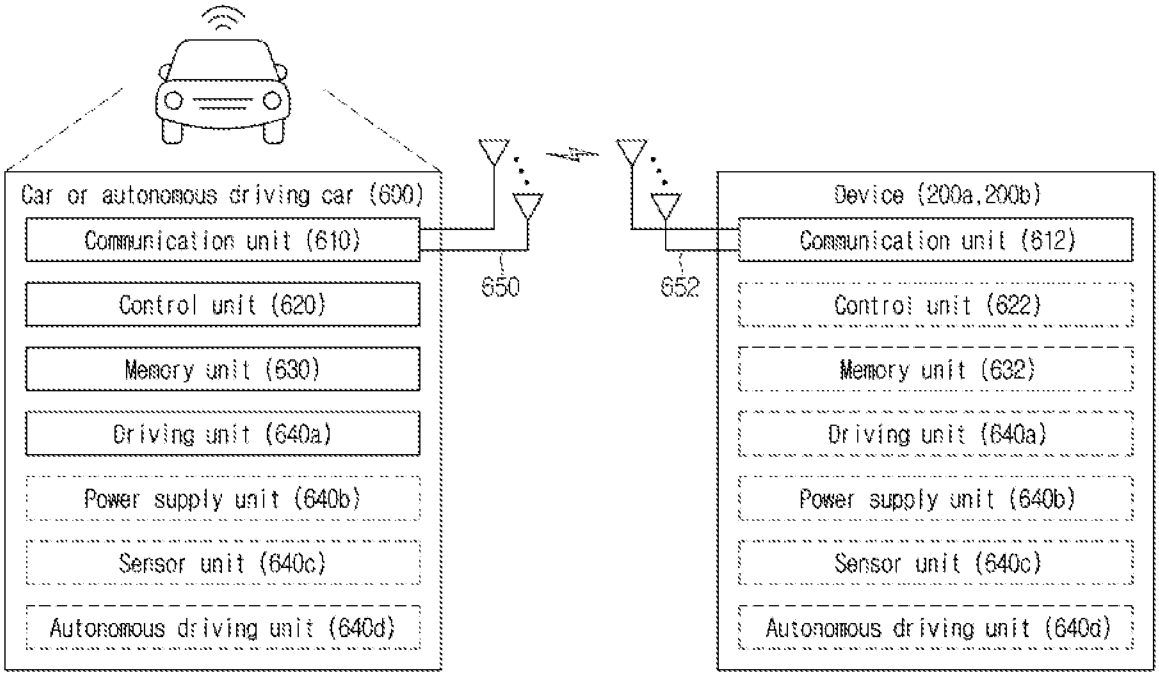
FIG. 23 illustrates a car or an autonomous vehicle applicable to the present disclosure.

FIG. 23 illustrates a car or an autonomous vehicle applicable to the present disclosure. FIG. 23 exemplifies a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited. The embodiment of FIG. 23 may be combined with various embodiments of the present disclosure.

Referring to FIG. 23, the car or autonomous driving car 600 may include an antenna unit (antenna) 608, a communication unit (transceiver) 610, a control unit (controller) 620, a driving unit 640*a*, a power supply unit (power supply) 640*b*, a sensor unit 640*c*, and an autonomous driving unit 640*d*. The antenna unit 650 may be configured as part of the communication unit 610. The blocks 610/630/640*a* to 640*d* correspond to the blocks 510/530/540 of FIG. 22, and duplicate descriptions are omitted.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

INDUSTRIAL AVAILABILITY

The embodiments of the present disclosure are applicable to various radio access systems. Examples of the various radio access systems include a 3$^{rd}$ generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method of performing sidelink communication by a first user equipment (UE) in a wireless communication system, the method comprising:

obtaining first information for one or more sidelink resource pools in which a sidelink signal can be transmitted, wherein each of the one or more sidelink resource pools include a plurality of contiguous frequency resources in a frequency domain, and a set of slots in a time domain;

determining at least one sidelink resource based on the one or more sidelink resource pools, wherein the at least one sidelink resource is determined by scheduling of a base station based on sidelink resource allocation mode 1, or the at least one sidelink resource is determined by the first UE based on sidelink resource allocation mode 2;

transmitting, to a second UE, at least one sidelink signal based on the at least one sidelink resource; and receiving, from the second UE, at least one response sidelink signal corresponding to the at least one sidelink signal, wherein the at least one sidelink signal is transmitted through beams, and a number of the beams and beam width of each of the beams are determined based on regions included in a target region, wherein each of regions is distinguished based on a distance from the first UE, wherein the at least one response sidelink signal comprises second information of beams detected by the second UE among the beams, wherein a distance between the first UE and the second UE is determined based on a first beam corresponding to a closest region from the first UE among the detected beams, and wherein a direction from the first UE to the second UE is determined based on a second beam corresponding to a farthest region from the first UE among the detected beams.

2. The method of claim 1, wherein a beam width of a first region among the regions is determined to be a first value and a beam width of a second region is determined to be a second value, and wherein, based on the first region being closer to the first UE than the second region, the first value is set to a value greater than the second value.

3. The method of claim 1, wherein a discovery beam set used by the first UE and the second UE for initial beam configuration and a tracking beam set used for beam refinement and beam tracking after the first UE and the second UE are connected are configured differently.

4. The method of claim 3, wherein beam widths and a number of beams included in each of the discovery beam set and the tracking beam set are determined differently according to the regions.

5. The method of claim 4, wherein, based on a beam width of the discovery beam set for a first region of the regions being determined to be a first value and a beam width of the discovery beam set for a second region which is a next adjacent region of the first region being determined to be a second value, the beam width of the tracking beam set for the first region is determined to be the second value.

6. The method of claim 5, wherein the number of beams of the tracking beam set for the first region is set greater than the number of beams of the discovery beam set for the second region.

7. The method of claim 1, wherein, based on the second UE detecting the at least one sidelink signal based on initial beam configuration or beam failure recovery, the second UE performs measurement on each of the at least one sidelink signal through sweeping to obtain third information including at least one measurement value for the at least one sidelink signal and transmits the third information as the at least one response sidelink signal.

8. The method of claim 7, wherein the third information includes measurement values of all of the at least one sidelink signal.

9. A first user equipment (UE) for performing sidelink communication in a wireless communication system, the first UE comprising:

a transceiver; and a processor connected to the transceiver, wherein the processor is configured to:

obtain first information for one or more sidelink resource pools in which a sidelink signal can be transmitted, wherein each of the one or more sidelink resource pools include a plurality of contiguous frequency resources in a frequency domain, and a set of slots in a time domain;

determine at least one sidelink resource based on the one or more sidelink resource pools, wherein the at least one sidelink resource is determined by scheduling of a base station based on sidelink resource allocation mode 1, or the at least one sidelink resource is determined by the first UE based on sidelink resource allocation mode 2;

transmit, through the transceiver to a second UE, at least one sidelink signal based on the at least one sidelink resource; and receive, through the transceiver from the second UE, at least one response sidelink signal corresponding to the at least one sidelink signal, wherein the at least one sidelink signal is transmitted through beams, and a number of the beams and beam width of each of the beams are determined based on regions included in a target region, wherein each of regions is distinguished based on a distance from the first UE, wherein the at least one response sidelink signal comprises second information of beams detected by the second UE among the beams, wherein a distance between the first UE and the second UE is determined based on a first beam corresponding to a closest region from the first UE among the detected beams, and wherein a direction from the first UE to the second UE is determined based on a second beam corresponding to a farthest region from the first UE among the detected beams.

10. A first user equipment (UE) for performing sidelink communication in a wireless communication system, the first UE comprising:

a transceiver; and a processor connected to the transceiver, wherein the processor is configured to:

obtain first information for one or more sidelink resource pools in which a sidelink signal can be transmitted, wherein each of the one or more sidelink resource pools include a plurality of contiguous frequency resources in a frequency domain, and a set of slots in a time domain;

determine at least one sidelink resource based on the one or more sidelink resource pools, wherein the at least one sidelink resource is determined by scheduling of a base station based on sidelink resource allocation mode 1, or the at least one sidelink resource is determined by the first UE based on sidelink resource allocation mode 2;

receive, through the transceiver from a second UE, at least one sidelink signal based on the at least one sidelink resource; and transmit, through the transceiver to the second UE, at least one response sidelink signal corresponding to the at least one sidelink signal, wherein the at least one sidelink signal is transmitted through beams, and a number of the beams and beam width of each of the beams are determined based on regions included in a target region, wherein each of regions is distinguished based on a distance from the second UE, wherein the at least one response sidelink signal comprises second information of beams detected by the first UE among the beams, wherein a distance between the first UE and the second UE is determined based on a first beam corresponding to a closest region from the second UE among the detected beams, and wherein a direction from the second UE to the first UE is determined based on a second beam corresponding to a farthest region from the second UE among the detected beams.

* * * * *